United States Patent
Aijima et al.

(10) Patent No.: US 9,321,221 B2
(45) Date of Patent: Apr. 26, 2016

(54) CONTINUOUS PREFORM DEVICE FOR COMPOSITE STRINGER

(71) Applicant: JAMCO CORPORATION, Tokyo (JP)

(72) Inventors: Masatoshi Aijima, Tokyo (JP); Masamoto Shuto, Tokyo (JP)

(73) Assignee: JAMCO CORPORATION, Tokyo (JP)

( * ) Notice: Subject to any disclaimer, the term of this patent is extended or adjusted under 35 U.S.C. 154(b) by 154 days.

(21) Appl. No.: 14/103,594

(22) Filed: Dec. 11, 2013

(65) Prior Publication Data

US 2015/0158281 A1  Jun. 11, 2015

(51) Int. Cl.
| | |
|---|---|
| *B29C 70/40* | (2006.01) |
| *B29C 70/50* | (2006.01) |
| *B29C 70/46* | (2006.01) |
| *B29C 70/34* | (2006.01) |
| *B29C 43/14* | (2006.01) |
| *B29D 99/00* | (2010.01) |
| *B64C 1/06* | (2006.01) |
| *B29L 31/00* | (2006.01) |

(52) U.S. Cl.
CPC .............. *B29C 70/504* (2013.01); *B29C 43/146* (2013.01); *B29C 70/345* (2013.01); *B29C 70/46* (2013.01); *B29D 99/0003* (2013.01); *B64C 1/064* (2013.01); *B29L 2031/001* (2013.01)

(58) Field of Classification Search
CPC .... B29C 70/46; B29C 70/462; B29C 70/504; B29C 70/345; B29C 2043/144; B29C 2043/148; B29C 2043/142; B29C 43/146
See application file for complete search history.

(56) References Cited

U.S. PATENT DOCUMENTS

| | | | |
|---|---|---|---|
| 2002/0059976 A1* | 5/2002 | Taggart | 156/177 |
| 2005/0140045 A1 | 6/2005 | Okamoto et al. | |
| 2005/0269016 A1* | 12/2005 | Oldani et al. | 156/182 |
| 2008/0053599 A1* | 3/2008 | Aijima | 156/196 |

(Continued)

FOREIGN PATENT DOCUMENTS

| | | |
|---|---|---|
| EP | 1 504 880 A1 | 2/2005 |
| EP | 1 894 706 A1 | 3/2008 |
| JP | 6-238758 A | 8/1994 |

(Continued)

OTHER PUBLICATIONS

Extended European Search Report dated Nov. 26, 2014, issued in corresponding EP application No. 13195424.0 (5 pages).

(Continued)

*Primary Examiner* — William Bell
(74) *Attorney, Agent, or Firm* — Westerman, Hattori, Daniels & Adrian, LLP

(57) ABSTRACT

A continuous preform device for a composite stringer continuously preforms the composite stringer having three-dimensional curved surfaces in an efficient manner, the continuous preform device including a dispenser device 200 adapted to supply a prepreg laminate to a next process by sandwiching upper and lower faces of the prepreg laminate with carrier films, a section preform device 300 adapted to form the prepreg laminate sandwiched between the carrier films into a desired cross-sectional shape during passage, a press/puller device 400 adapted to apply a pressing process to the prepreg laminate and intermittently feed a composite downstream, and a curing mold forming device 500 adapted to preform the prepreg laminate into a desired stringer shape on a curing mold 20, which are placed in a straight line from upstream to downstream.

7 Claims, 36 Drawing Sheets

(56) References Cited

U.S. PATENT DOCUMENTS

| | | |
|---|---|---|
| 2009/0000726 A1* | 1/2009 | McCowin et al. ............ 156/212 |
| 2009/0243151 A1 | 10/2009 | Aijima |
| 2010/0051183 A1* | 3/2010 | Boke et al. .................... 156/228 |
| 2011/0115115 A1* | 5/2011 | Winter .......................... 264/175 |
| 2012/0273989 A1* | 11/2012 | Graf .............................. 264/148 |
| 2014/0251529 A1* | 9/2014 | Blot et al. ..................... 156/196 |

FOREIGN PATENT DOCUMENTS

| | | |
|---|---|---|
| JP | 2009234046 A | 10/2009 |
| WO | 2005/011961 A1 | 2/2005 |

OTHER PUBLICATIONS

Office action dated Nov. 10, 2015, issued in counterpart Japanese Application No. 2012-126805 (4 pages).

* cited by examiner

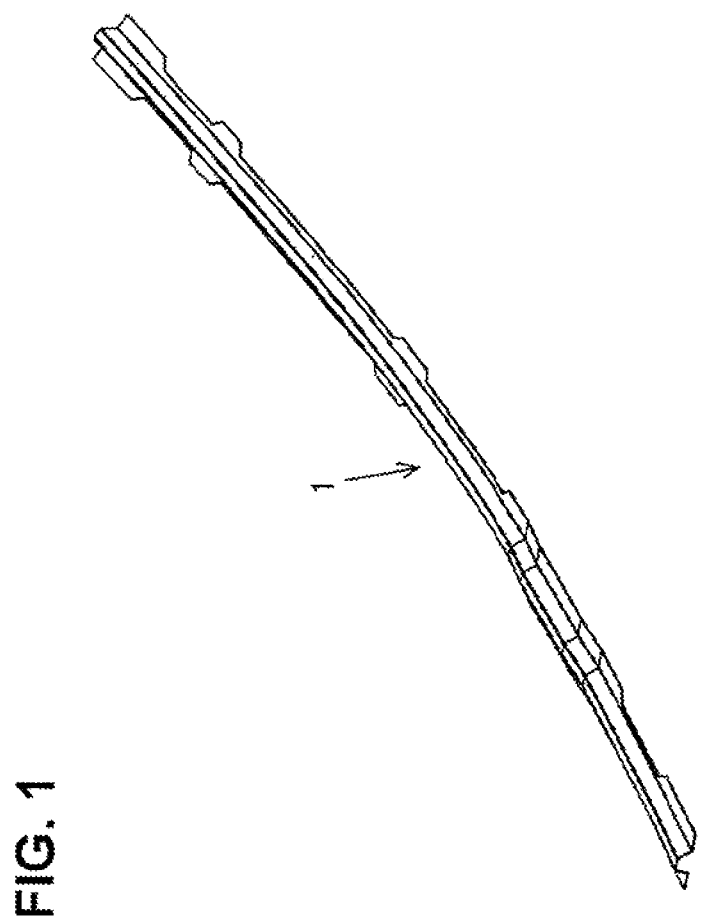
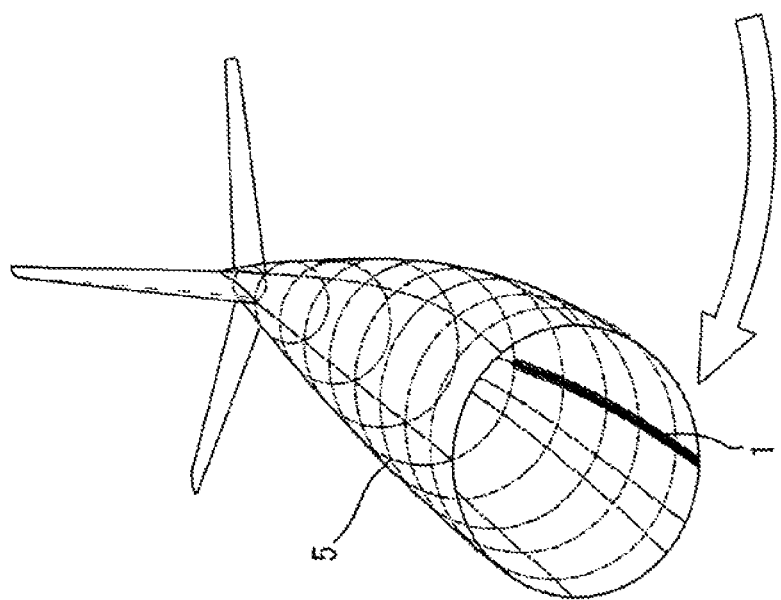
FIG. 1

A-A SECTION

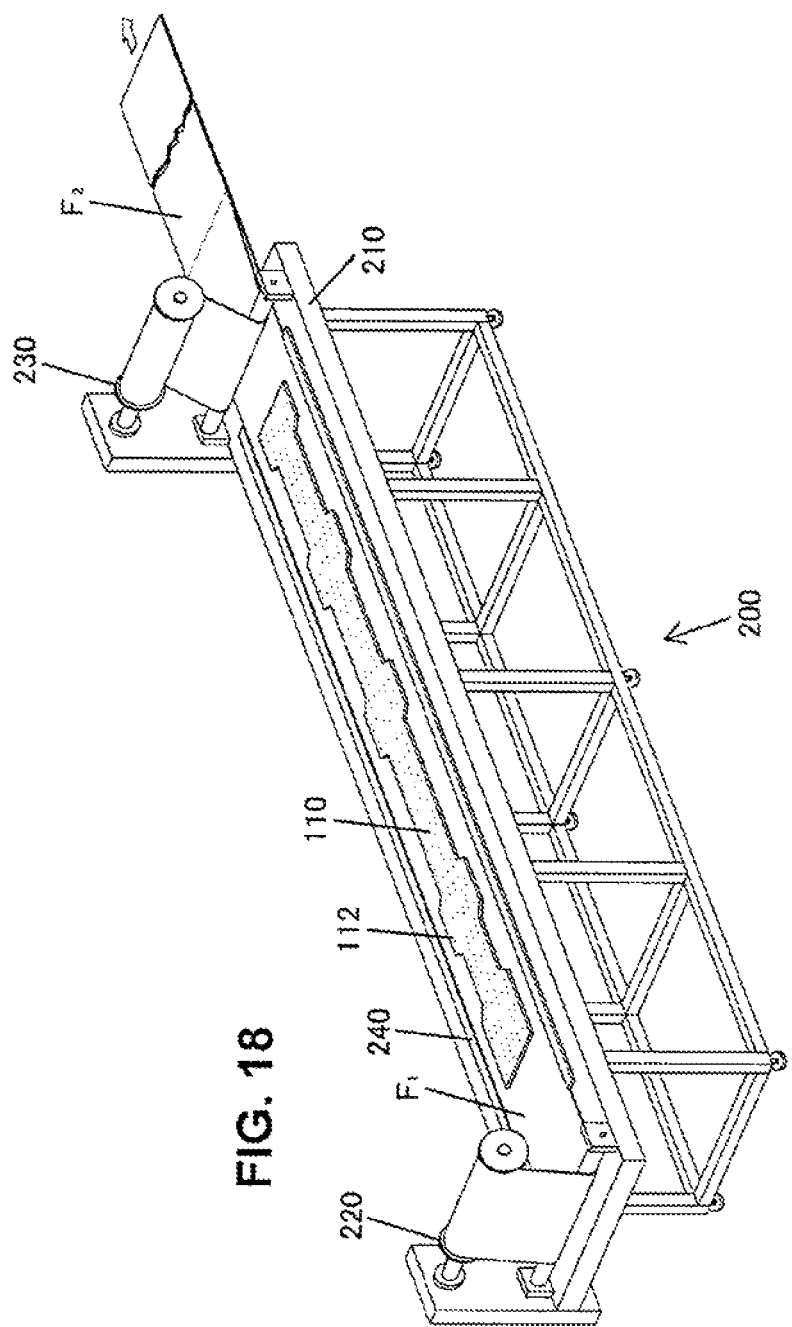

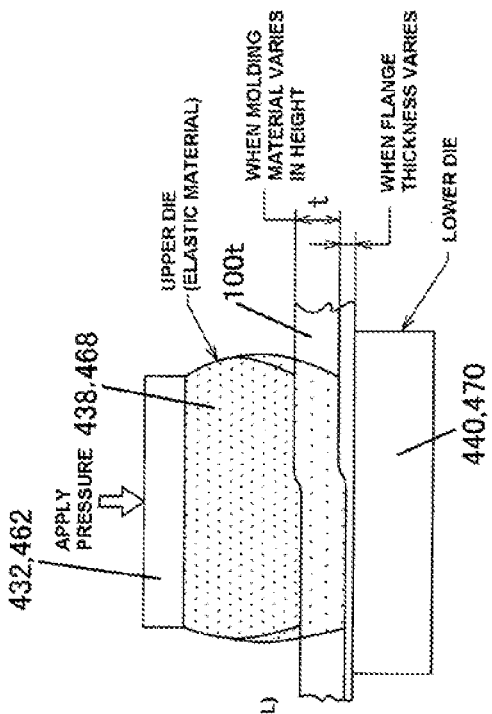
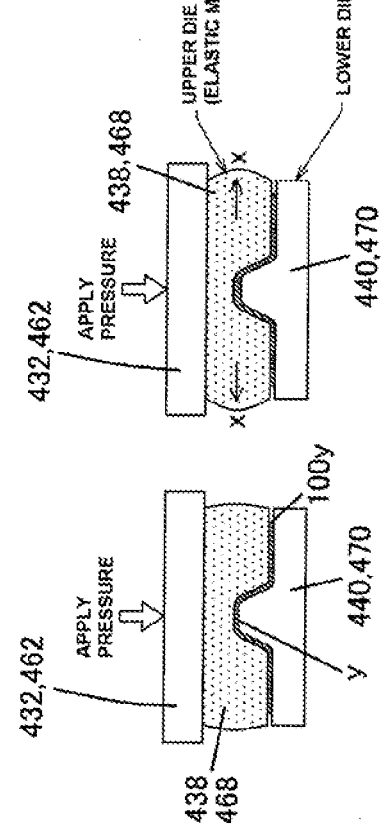
FIG. 24A  FIG. 24B  FIG. 24C

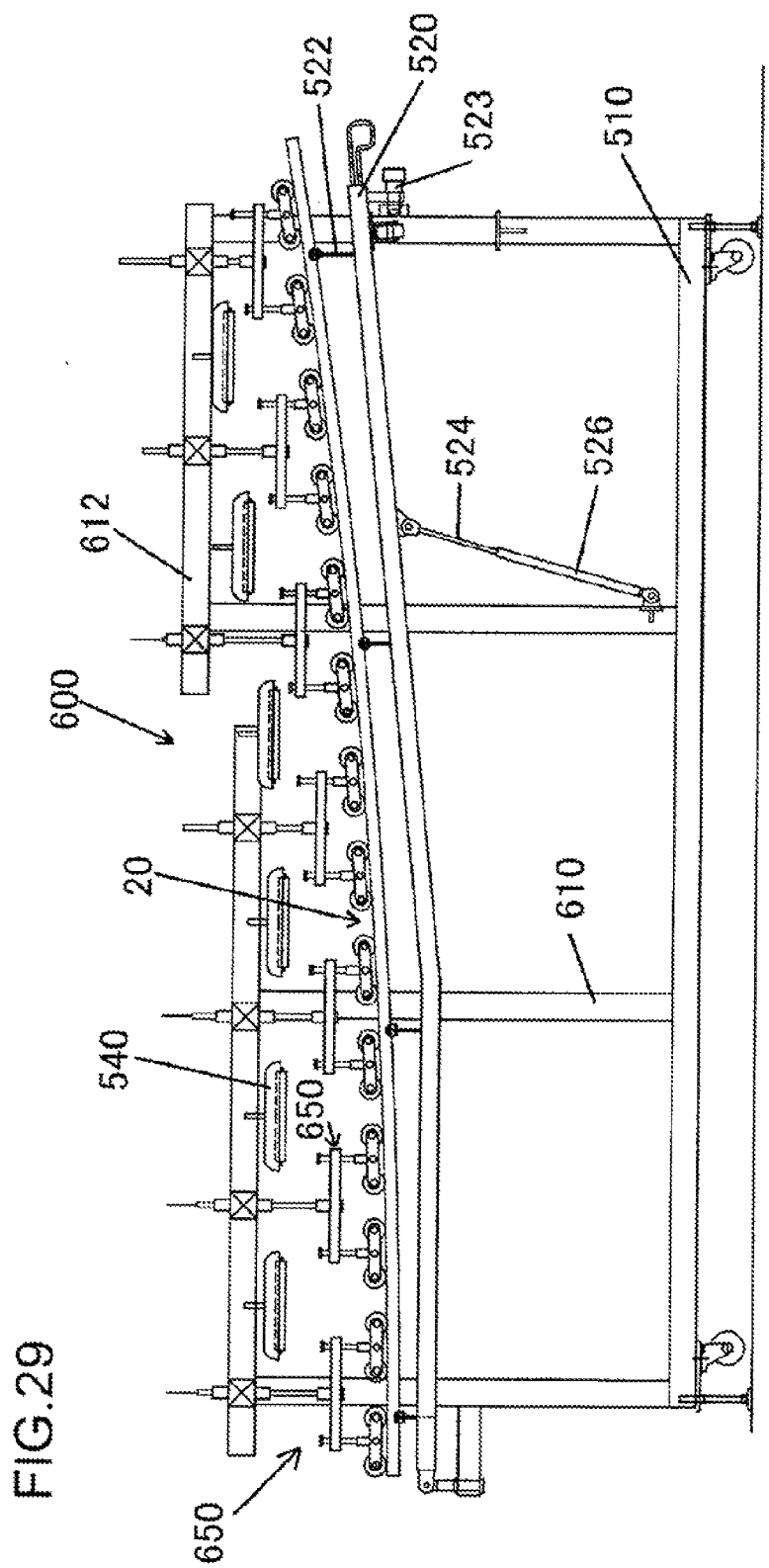

CONTINUOUS PREFORM DEVICE FOR COMPOSITE STRINGER

BACKGROUND OF THE INVENTION

1. Field of the Invention

The present invention relates to a continuous preform device for a composite stringer formed of a prepreg and used as a structural member such as a fuselage of an aircraft, where the prepreg is a composite prepared by impregnating carbon fiber or the like with a thermosetting resin.

2. Description of the Related Art

When the fuselage of an aircraft or the like is produced from a composite, a reinforcing member known as a stringer, which is a long member having a cross section of a so-called hat shape or omega shape, is used as a structural member.

WO 2005/011961 A1 discloses a technique for forming a reinforcing member from a composite of this type.

The technique disclosed in WO 2005/011961 involves supplying composite sheet to an upper face of a forming die called a mandrel, pressing the composite against the mandrel from the upper surface thereof with a roller, and thereby forming a long sheet with a desired cross-sectional shape.

A predetermined number of composite sheets thus formed are laminated one after another to form the reinforcing member.

The technique disclosed in WO 2005/011961 produces a molding such as a long reinforcing member by forming composite sheets, but the reinforcing member is produced by forming and laminating a predetermined number of the composite sheets one after another rather than by forming a laminated sheet at once.

The stringer used for the fuselage of an aircraft needs a longitudinally twisted shape in addition to having a curvature longitudinally along the shape of the fuselage according to placement locations.

An object of the present invention is to provide a continuous preform device capable of preforming a composite stringer which satisfies the above requirement, in a single series of successive processes.

SUMMARY OF THE INVENTION

The present invention provides a device adapted to continuously preform a stringer made of laminated composite prepreg of a predetermined length, comprising: a dispenser device adapted to supply a prepreg laminate to a next process by sandwiching upper and lower faces of the prepreg laminate with carrier films; a section preform device adapted to form the prepreg laminate into a desired cross-sectional shape together with the carrier films; a press/puller device adapted to apply a pressing process to the prepreg laminate sandwiched between the carrier films while feeding the prepreg laminate intermittently; and a curing mold forming device equipped with a forming die member and a guide roller and adapted to form the incoming prepreg laminate sandwiched between the carrier films into a shape appropriate to a process preceding a curing process.

The dispenser device comprises a table adapted to transport the laminated composite prepreg; a reel installed at one end of the table and adapted to supply the carrier film for the lower face; and a reel installed at another end of the table and adapted to supply the carrier film for the upper face. Furthermore, the dispenser device comprises a guide plate adapted to prevent the prepreg sandwiched between the carrier films from weaving in left and right directions.

Also, the section preform device comprises a plurality of preform shaping rollers adapted to form a cross-sectional shape of the prepreg laminate sandwiched between the carrier films into a hat shape or an omega shape; and a heater adapted to soften the laminated composite prepreg to a degree suitable for forming. Desirably the heater is, for example, an infrared radiant heater provided with a temperature regulation function.

Also, the press/puller device comprises a press unit provided with an upper die, a lower die, and a heater; an upper die and a lower die; and a feed cylinder adapted to cause the entire unit to reciprocate. Desirably the heater is, for example, an infrared radiant heater provided with a temperature regulation function.

Furthermore, the curing mold forming device comprises a table adapted to go up and down by supporting the curing mold; a plurality of forming guide rollers adapted to press the prepreg laminate via a compression spring, the prepreg laminate being sandwiched between the carrier films and put on the curing mold; and a heater adapted to soften the composite prepreg to a degree suitable for forming. Desirably the heater is, for example, an infrared radiant heater provided with a temperature regulation function. Desirably the curing mold, which is exposed to 180° C. or 125° C. heat during curing in an autoclave in a succeeding process, is made of a material with a low thermal expansion coefficient. Therefore Invar or the like is desirable among metallic materials, and a composite material which is a combination of carbon fiber and a highly heat-resistant resin is more desirable because the composite material is easy to produce and light for its size.

Being configured as described above, the present invention can continuously preform a composite stringer hat-shaped or omega-shaped in cross section, provided with a curvature in a longitudinal direction, and configured to be twisted.

BRIEF DESCRIPTION OF THE DRAWINGS

FIG. 1 is an explanatory diagram of a stringer mounted on a fuselage of an aircraft;

FIG. 18 is an explanatory diagram of a dispenser device;

FIG. 22 is a diagram illustrating the operation of a press/puller device;

FIG. 23A is a diagram illustrating the operation of a press/puller device;

FIG. 23B is a diagram illustrating the operation of a press/puller device;

FIG. 24A is an explanatory diagram of a press/puller device;

FIG. 24B is an explanatory diagram of a press/puller device;

FIG. 24C is an explanatory diagram of a press/puller device;

FIG. 29 is an explanatory diagram showing another example of the curing mold forming device;

DETAILED DESCRIPTION OF THE PREFERRED EMBODIMENTS

FIG. 1 is an explanatory diagram showing how a stringer molding 1 made of a composite according to the present invention is applied to an aircraft fuselage 5.

The stringer molding 1 is used as a structural material making up the aircraft fuselage 5 by being fixed along an inner wall surface of the aircraft fuselage 5 in an axial direction of the aircraft fuselage 5.

The aircraft fuselage 5 has a three-dimensional curved surface shape, so the stringer molding 1 attached to the inner wall surface of the aircraft fuselage 5 needs to have a three-dimensional shape according to a placement location on the inner wall surface of the aircraft fuselage 5.

Figure 2:
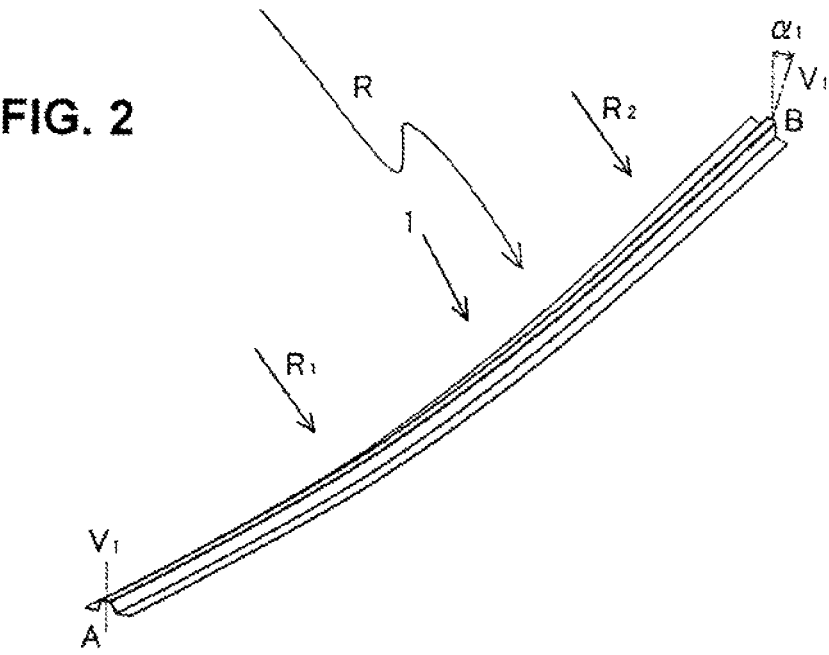
FIG. 2 is an explanatory diagram of a stringer produced by the present invention.

FIG. 2 shows a stringer molding 1 having a basic structure.

The stringer molding has a cross section of a so-called hat shape or omega shape. The molding 1 is a long curved member having a radius of curvature R in a longitudinal direction. The radius of curvature R is not limited to a fixed radius of curvature, and may naturally be variable, changing to a radius of curvature $R_1$ to $R_2$, and so forth in a longitudinal direction.

Also, the stringer molding 1 may be a long molding whose cross section at one end A is shaped to be symmetrical with respect to a vertical line $V_1$ and whose other end B has a torsional angle $\alpha_1$ with respect to the vertical line $V_1$. The radius of curvature R and torsional angle $\alpha_1$ vary with the installation location on the aircraft fuselage 5 where the stringer molding 1 is used.

Figure 3:
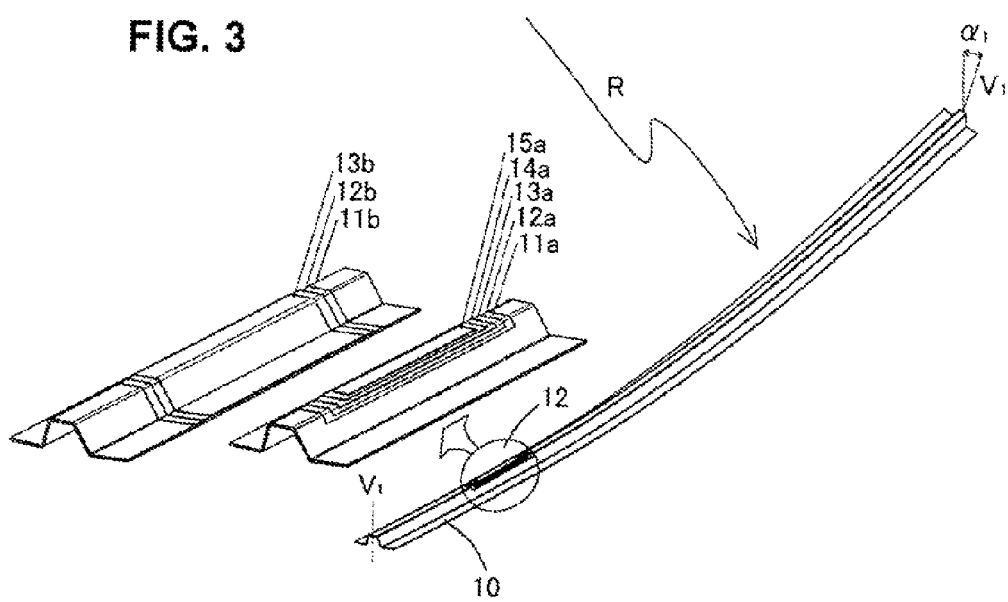
FIG. 3 is an explanatory diagram of a stringer produced by the present invention.

FIG. 3 shows a molding 10 which has an area with a different thickness. The molding 10 shown in FIG. 3 has an area 12 with an increased board thickness. The area 12 is constructed by laminating plural prepreg sheets 11a, 12a, 13a, 14a, and 15a. The sheets 11a to 15a are laminated one after another onto required locations. The cross-sectional shape of the laminated prepreg sheets may naturally be formed by laminating prepreg sheets with an identical cross section, such as prepreg sheets 11b, 12b, and 13b equal in cross-sectional shape to the molding 10 having an area with a different thickness.

Figure 4:
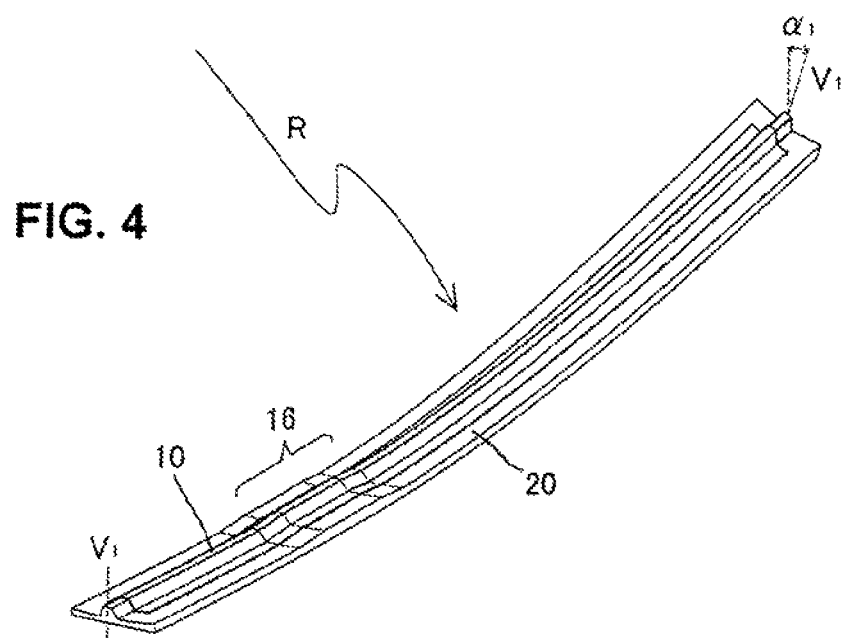
FIG. 4 is an explanatory diagram of a stringer and curing mold.

FIG. 4 shows the molding 10 equipped with a so-called joggle portion 16 as well as a curing mold 20 shaped to form the joggle portion, where the stringer is raised along the joggle portion in locations where the inner wall surface of the aircraft fuselage is thickened. A slope corresponding to height variation of the joggle portion is normally around 20:1, and a curing mold forming device described later can do forming in such a way as to accommodate such a joggle.

As described later, the present invention does forming which involves forming the molding 10 on the curing mold 20 corresponding to the product shape and sending the molding 10 to a succeeding process, namely a thermosetting (heat-curing) process, the molding 10 being provided with the area 12 different in thickness, with the joggle portion 16, and with a curvature and twist which occur in a longitudinal direction.

Figure 5:
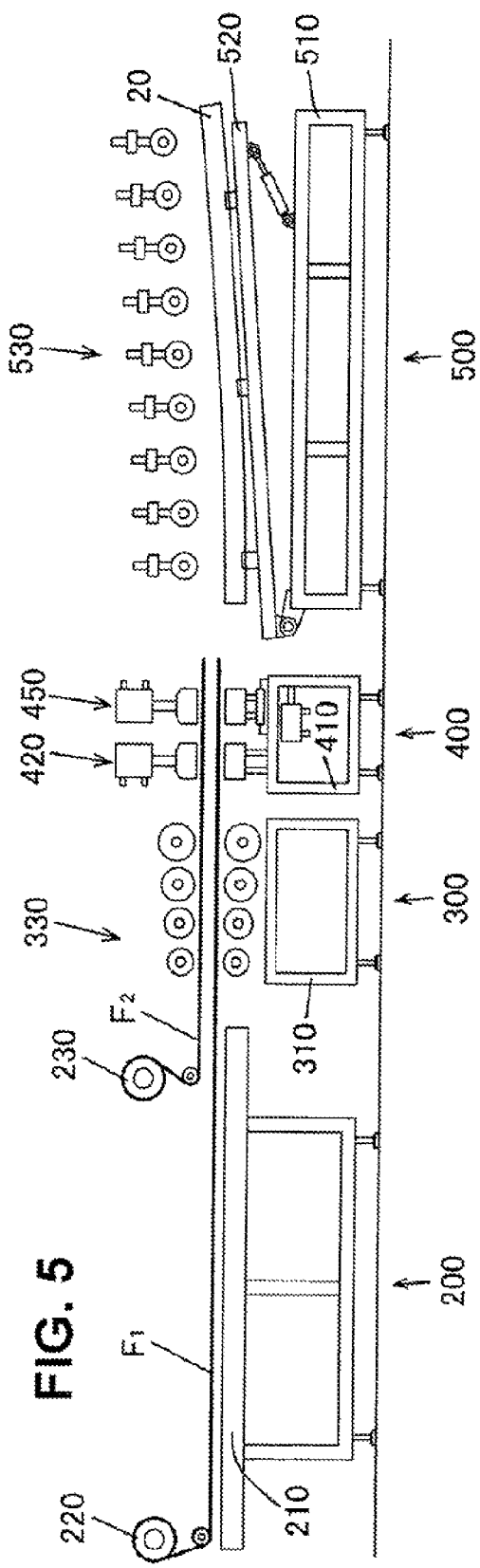
FIG. 5 is an explanatory diagram of a continuous preform device for a composite stringer according to the present invention.

FIG. 5 is an explanatory diagram showing a configuration of a continuous preform device for a composite stringer according to the present invention.

The continuous preform device for a composite stringer includes a dispenser device 200, a section preform device 300, a press/puller device 400, and a curing mold forming device 500, which are placed in a straight line from upstream to downstream.

The dispenser device 200 includes a table 210 as well as a carrier film delivery roll 220 and carrier film delivery roll 230 located on an upstream side and downstream side of the table 210, respectively, and adapted to send out carrier films. The carrier film delivery roll 220 installed on the upstream side of the table 210 supplies a carrier film $F_1$ for a lower face of the prepreg composite while the carrier film delivery roll 230 installed on the downstream side of the table 210 supplies a carrier film $F_2$ for an upper face of the prepreg composite.

The section preform device 300 includes a section preform shaping rollers 330 with plural shaping rollers placed above a base 310.

The press/puller device 400 have a press unit 420 and a puller unit 450 on a base 410.

The curing mold forming device 500 has a raisable table 520 on a base 510. The table 520 supports the curing mold 20, and plural molding guide rollers 530 are disposed above the curing mold 20.

Figure 6:
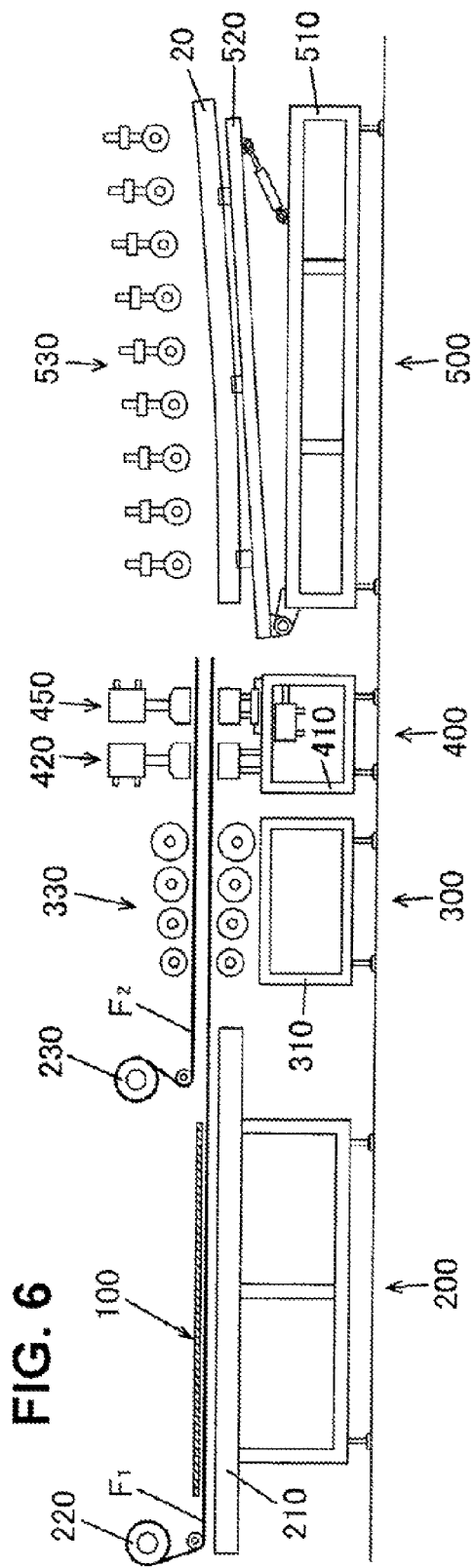
FIG. 6 is an explanatory diagram of a continuous preform device for a composite stringer according to the present invention.

FIG. 6 shows a process for setting a prepreg laminate 100 on a top face of the lower-face carrier film $F_1$ on the table 210 of the dispenser device 200.

The prepreg laminate 100 is put on the lower-face carrier film $F_1$ sent out from the carrier film delivery roll 220 onto the table 210.

The prepreg laminate 100 is a material produced by laying up (laminating) a necessary number of sheets of prepreg, which has been prepared by impregnating carbon fiber with epoxy resin, for example. Instead of carbon fiber, glass fiber or aramid fiber may be used as well. Also, the impregnating resin may be any thermosetting resin which cures, for example, in a temperature range of about 180° C. to 125° C., and bismaleimide resin is used, for example.

Figure 7:
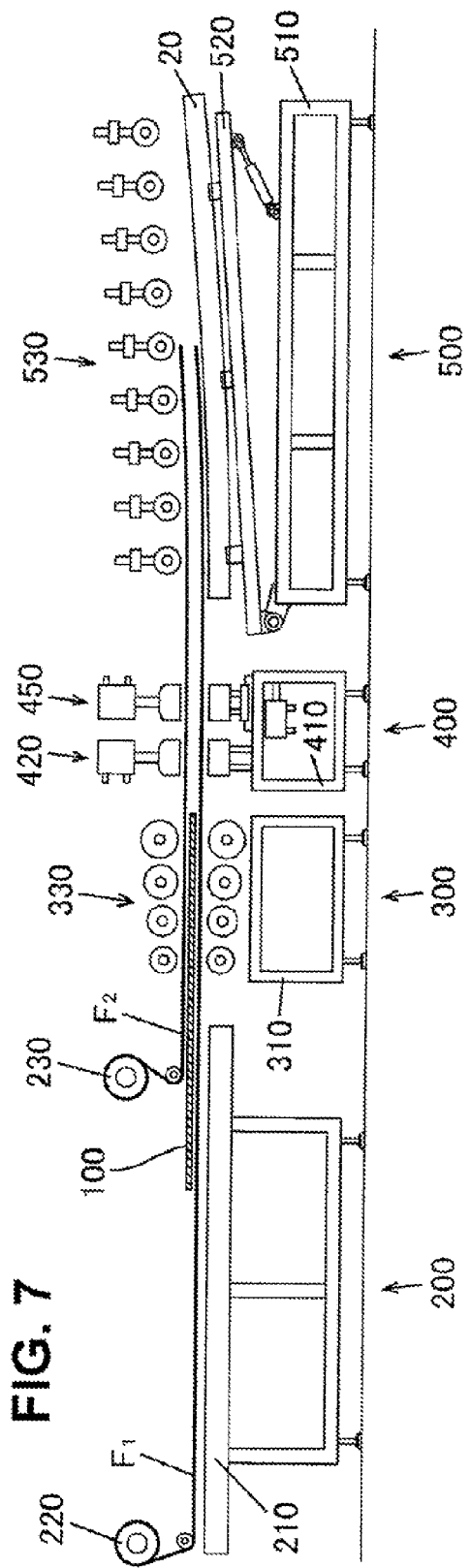
FIG. 7 is an explanatory diagram of a continuous preform device for a composite stringer according to the present invention.

FIG. 7 shows a process in which the prepreg laminate 100 from the dispenser device 200 is preformed on the section preform device 300, becoming hat-shaped or omega-shaped in cross section.

The upper-face carrier film $F_2$ sent out by the downstream carrier film delivery roll 230 is laminated on the prepreg laminate 100 laid over the lower-face carrier film $F_1$. The prepreg laminate 100 sandwiched between the lower-face carrier film $F_1$ and upper-face carrier film $F_2$ is caused to pass the section preform device 300 by operation of the press/puller device 400.

Using the press unit 420 disposed upstream and puller unit 450 disposed downstream, the press/puller device 400 causes the prepreg laminate 100 to pass through various devices together with the lower-face carrier film $F_1$ and upper-face carrier film $F_2$ in a manner described below.

Figure 8:
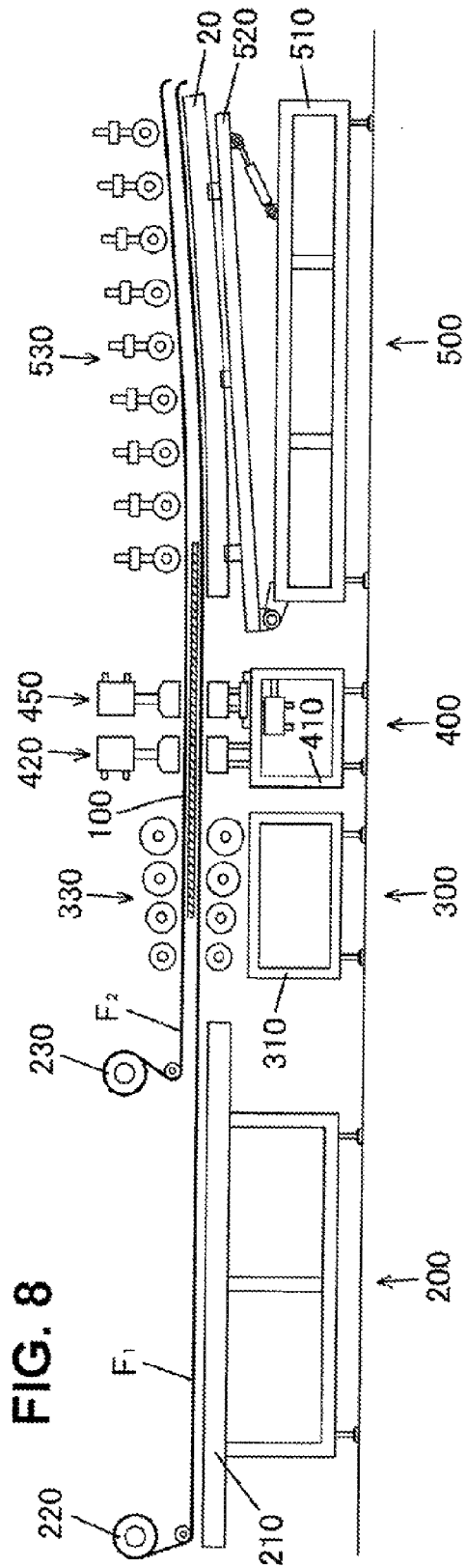
FIG. 8 is an explanatory diagram of a continuous preform device for a composite stringer according to the present invention.

FIG. 8 shows a process in which through operation of the press/puller device 400, the prepreg laminate 100 is caused to pass the section preform device 300 in order for its cross-sectional shape to be preformed and is then fed into the curing mold forming device 500.

Figure 9:
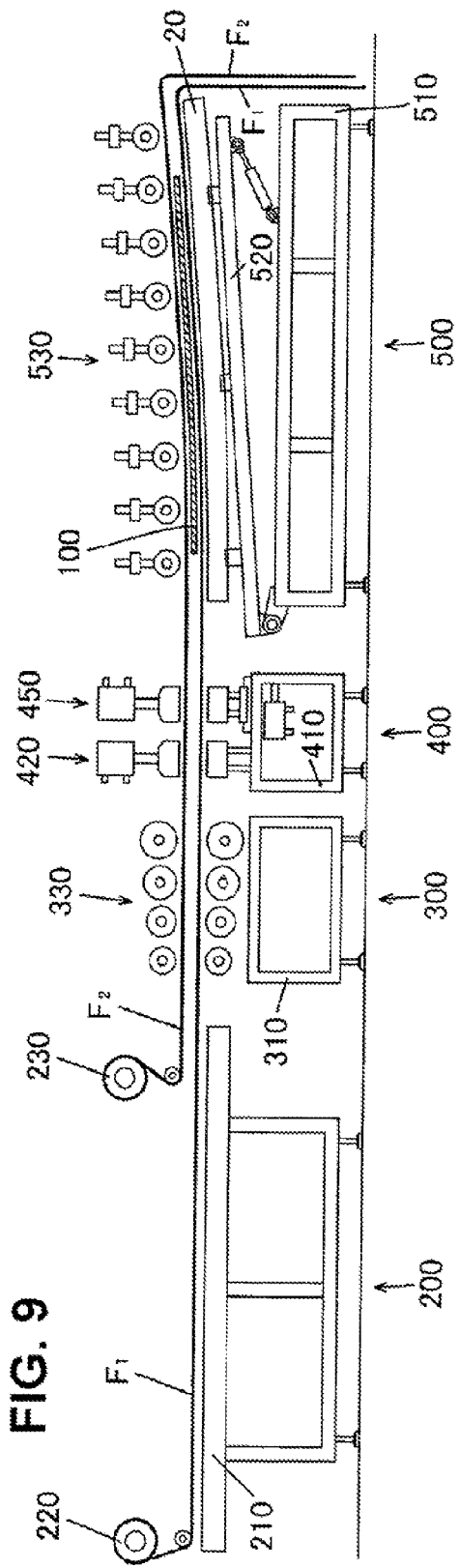
FIG. 9 is an explanatory diagram of a continuous preform device for a composite stringer according to the present invention.
Figure 10:
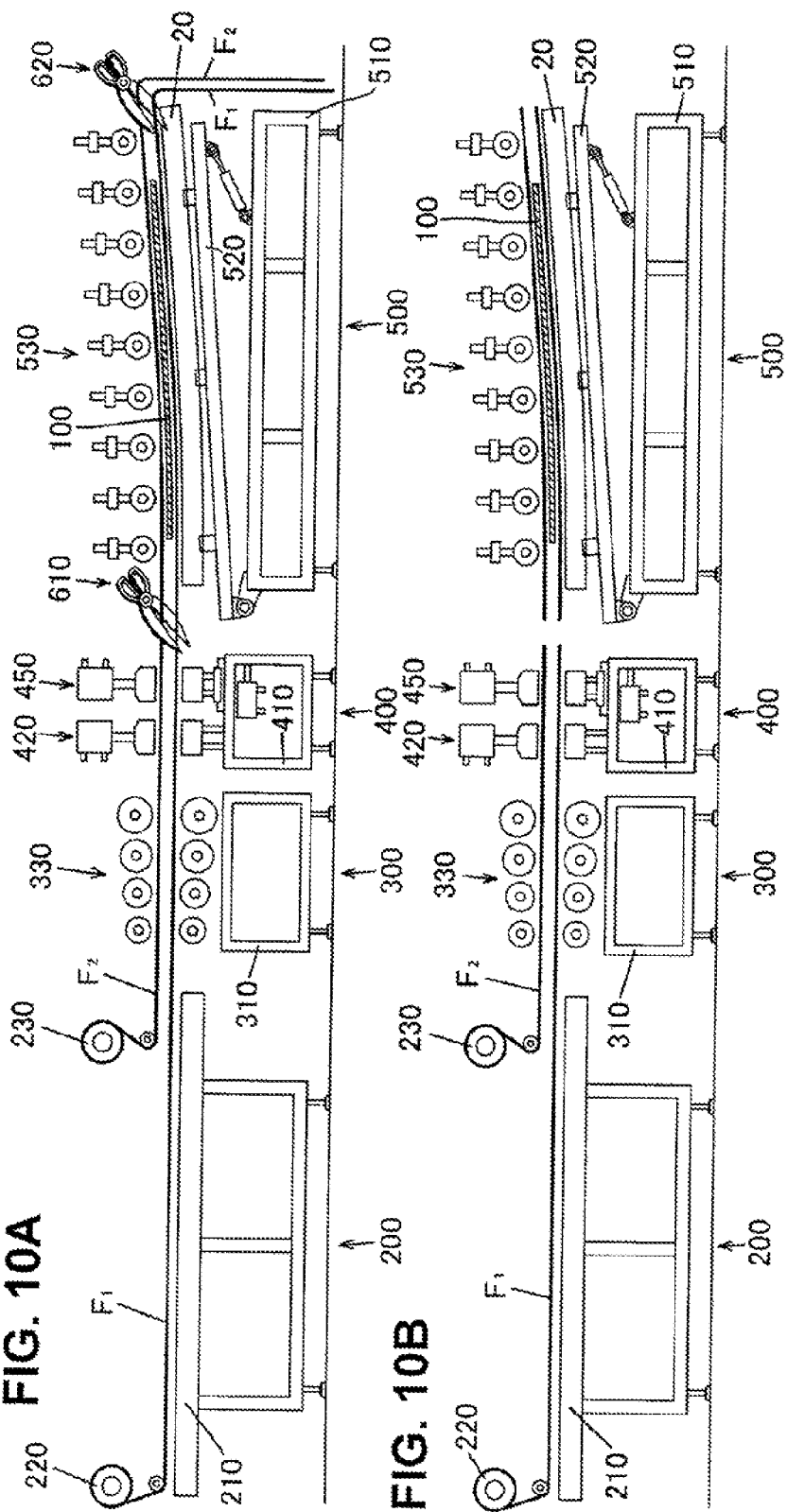
FIG. 10A is an explanatory diagram of a continuous preform device for a composite stringer according to the present invention.
FIG. 10B is an explanatory diagram of a continuous preform device for a composite stringer according to the present invention.

FIGS. 9 and 10 show a process in which the molding guide rollers 530 form the prepreg laminate 100 into a predetermined shape by pressing the prepreg laminate 100 against the curing mold 20 supported on the table 520 of the curing mold forming device 500.

The press/puller device 400 stops feeding when the prepreg laminate 100 is fed completely into the curing mold forming device 500.

FIG. 10A shows a process in which the lower-face carrier film $F_1$ and upper-face carrier film $F_2$ are cut by a cutter 610 and cutter 620 in front of and behind the prepreg laminate 100 formed by the curing mold forming device 500 while FIG. 10B shows how the lower-face carrier film $F_1$ and upper-face carrier film $F_2$ overlaid on the upper and lower faces of the prepreg laminate 100 have been cut off.

Figure 11:
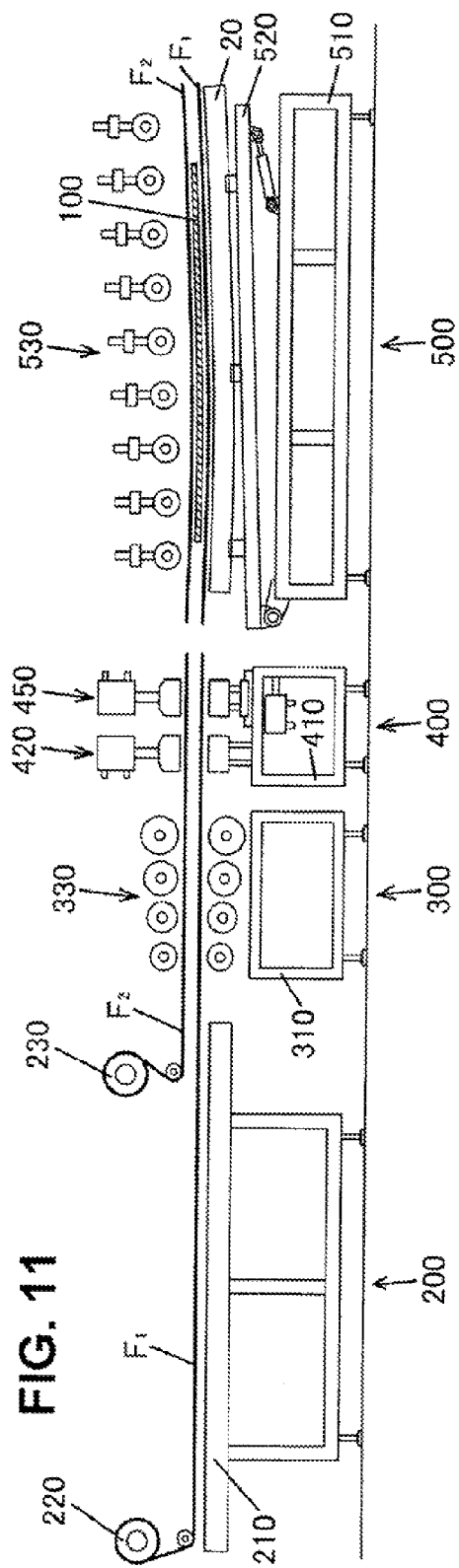
FIG. 11 is an explanatory diagram of a continuous preform device for a composite stringer according to the present invention.

FIG. 11 shows a process in which the table 520 carrying the prepreg laminate 100 and curing mold 20 is lowered and separated from the molding guide roller 530. The prepreg laminate 100 formed in such a way as to conform to the shape of the curing mold pinched by the carrier films $F_1$ and $F_2$ is placed here. The table 520 carrying the prepreg laminate 100 and curing mold 20 is lowered.

Figure 12:
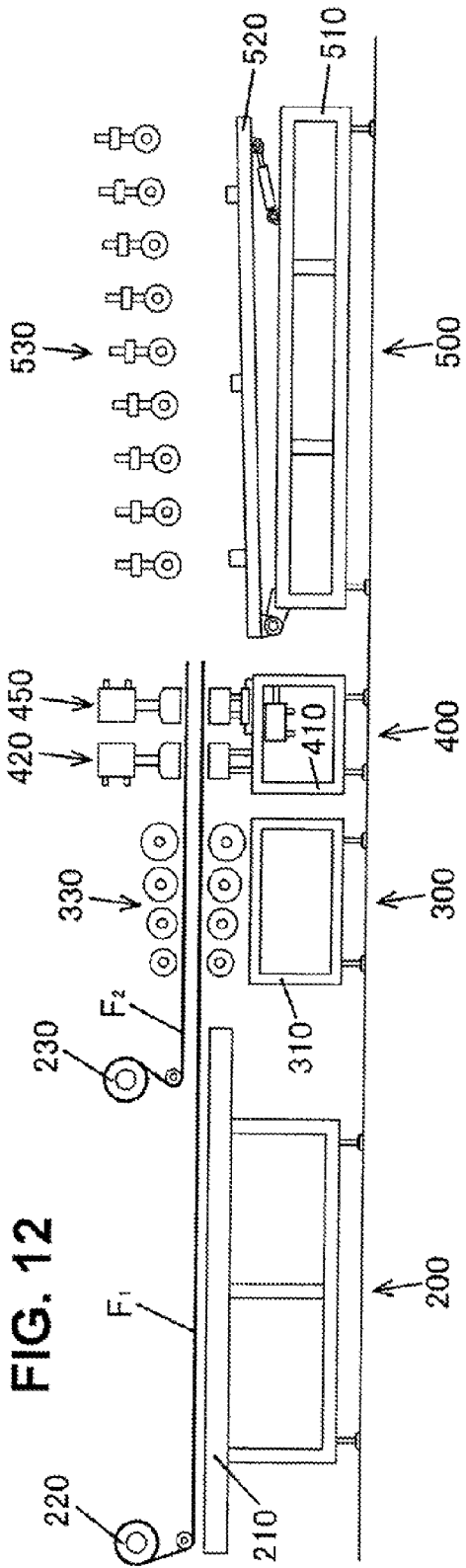
FIG. 12 is an explanatory diagram of a continuous preform device for a composite stringer according to the present invention.

FIG. 12 shows how the curing mold 20 with the prepreg laminate 100 mounted thereon has been removed from the table 520.

Figure 13:
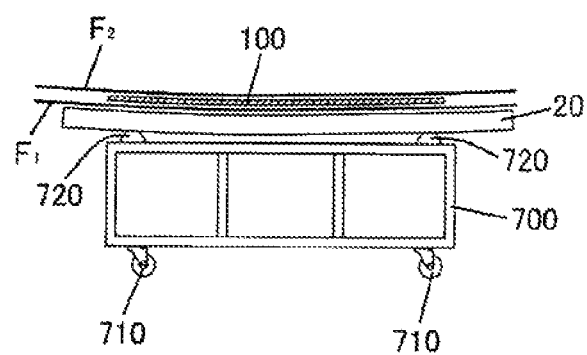
FIG. 13 is an explanatory diagram of a work carrier on which a curing mold is mounted.

FIG. 13 shows a process in which the curing mold 20 with the prepreg laminate 100 overlaid integrally thereon is set on a work carrier 700. The work carrier 700 has wheels 710 for use to move to a next process and supports the curing mold 20 on a support 720.

Figure 14:
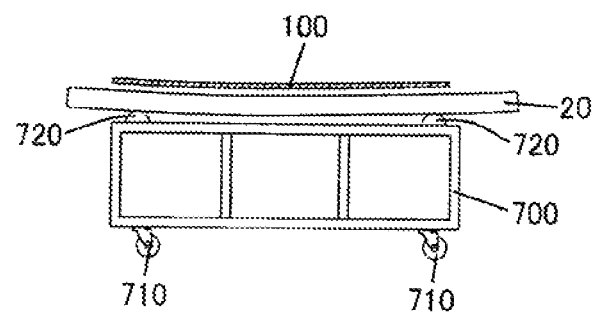
FIG. 14 is an explanatory diagram of a work carrier on which a curing mold is mounted.

FIG. 14 shows how the lower-face carrier film $F_1$ and upper-face carrier film $F_2$ covering both faces of the prepreg laminate 100 on the curing mold 20 have been removed.

Figure 15:
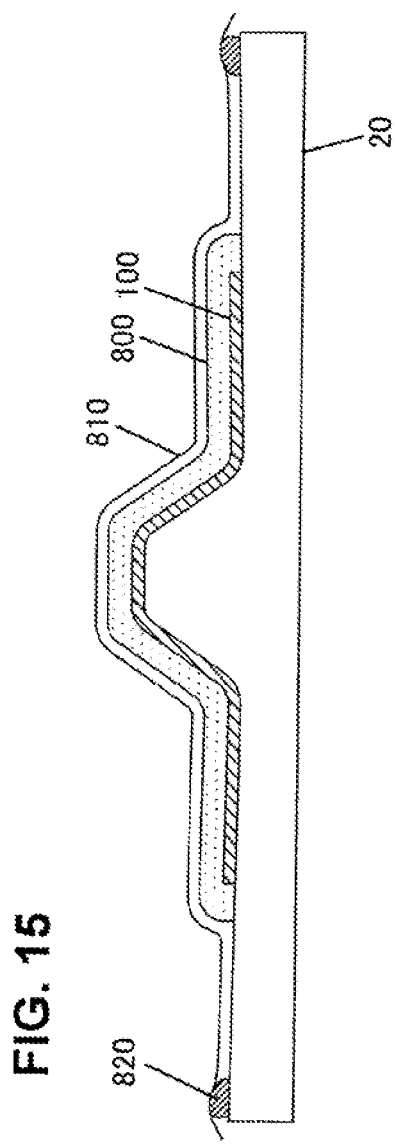
FIG. 15 is an explanatory diagram of a process preceding a curing process.

FIG. 15 shows a process which involves covering the prepreg laminate 100 mounted on the curing mold 20 with a pressure pad 800, covering the pressure pad 800 with a bagging film 810, and sealing a periphery airtightly with a sealant 820, the curing mold 20 having the shape to be preformed.

After sealing, the inside of the bagging film 810 is depressurized and thereby evacuated. As a result of this process, the prepreg laminate 100 adheres closely to the curing mold 20.

Figure 16:
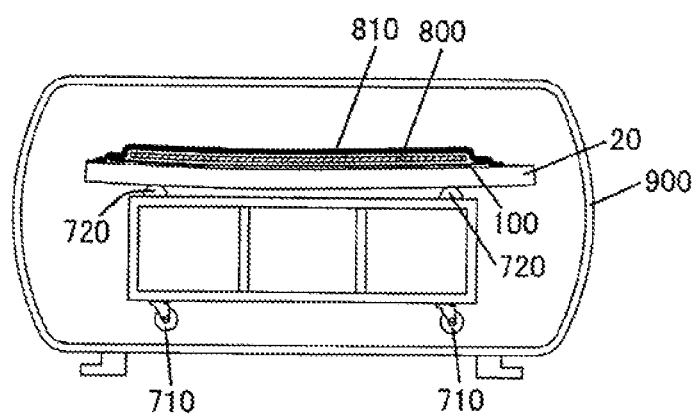
FIG. 16 is an explanatory diagram of a curing process using an autoclave.

FIG. 16 shows a process for carrying the curing mold 20 with the evacuated prepreg laminate 100 mounted thereon into an autoclave 900 together with the work carrier 700 and curing the prepreg by heating and pressurization, to complete a molding.

FIG. 17A to FIG. 27 show details of the devices making up the continuous preform device for the composite stringer according to the present invention.

Figure 17A:
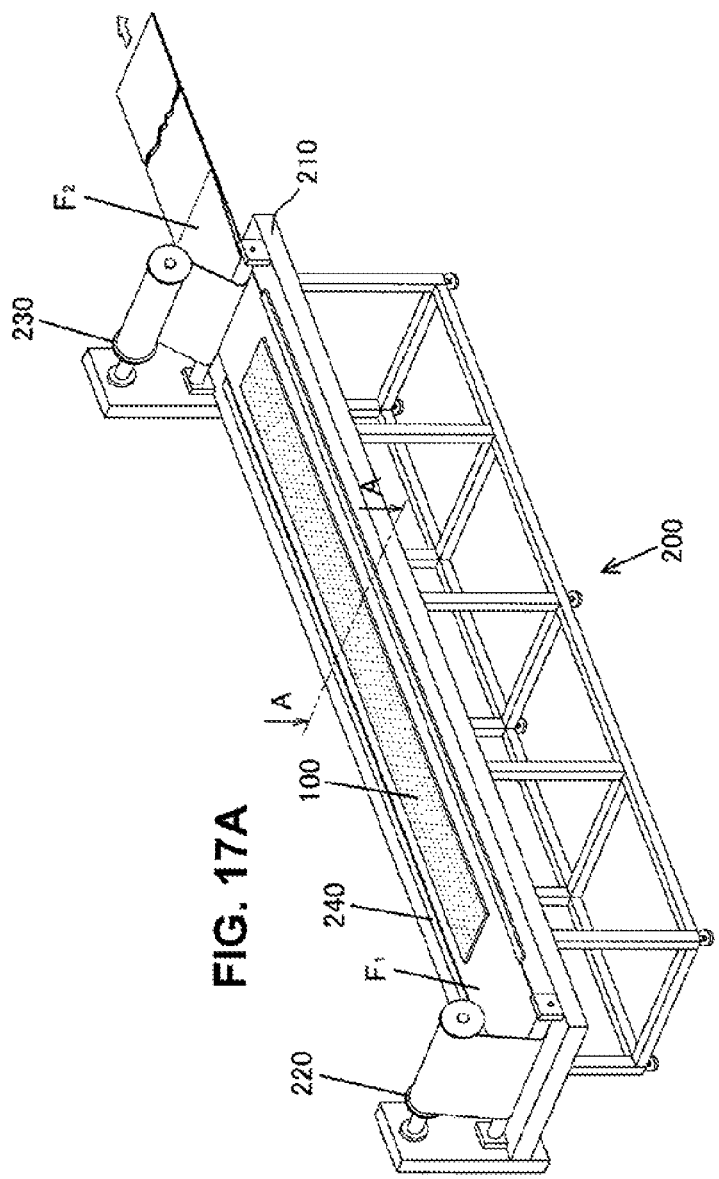
FIG. 17A is an explanatory diagram of a dispenser device.
Figure 17B:
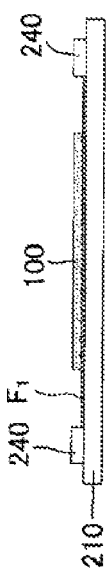
FIG. 17B is an A-A section view of the dispenser device.

FIG. 17A is a perspective view of the dispenser device 200.

On the table 210, the prepreg laminate 100 is put on the lower-face carrier film $F_1$ delivered from the carrier film delivery roll 220. The prepreg laminate 100 is constructed by laying, one on top of another, a necessary number of sheets of prepreg differing in fiber direction. The prepreg laminate 100 may be laid up (laminated) manually by an operator or by a device called AFP (Automated Fiber Placement). The latter method is more rational in terms of labor-saving because the prepreg laminate produced by automatically laminating prepreg tape or prepreg tow of a predetermined width into a flat plate can be put on the lower-face carrier film $F_1$.

The prepreg laminate 100 laid up on the lower-face carrier film $F_1$ on the table 210 is moved to a next process along with movement of the lower-face carrier film $F_1$, and is then delivered to a next process by being covered with the upper-face carrier film $F_2$ delivered from the carrier film delivery roll 230. The lower-face carrier film $F_1$ moving with the prepreg laminate 100 is allowed by a guide plate 240 to move along a predetermined line without weaving left and right.

FIG. 18 shows a prepreg laminate 110 different in planar shape from the prepreg laminate 100. The prepreg laminate 110 is provided with narrow-flanged portions and wide-flanged portions, making it possible to reduce cutting time needed to produce a predetermined stringer shape after thermosetting (curing) in a succeeding process as well as waste of prepreg material. This form of prepreg laminate 110 is also moved by being laid up on the lower-face carrier film $F_1$, and is then covered with the upper-face carrier film $F_2$.

Figure 19:
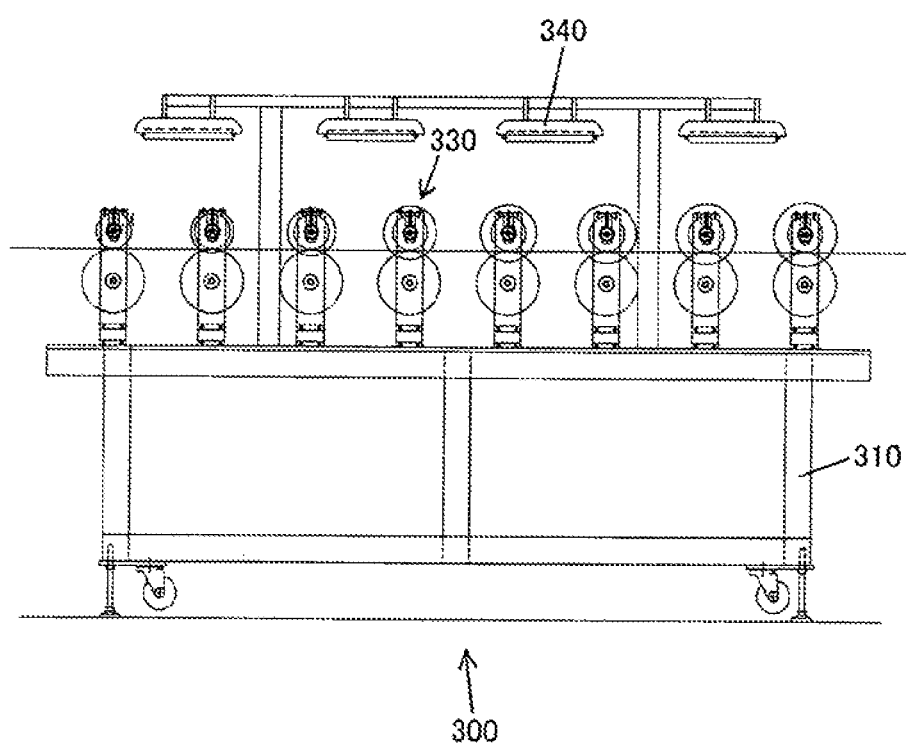
FIG. 19 is an explanatory diagram of a section preform device.

FIG. 19 shows details of the section preform device 300. Plural preform shaping rollers are placed on the base 310 and heaters 340 are placed thereabove to heat the prepreg laminate.

Figure 20:
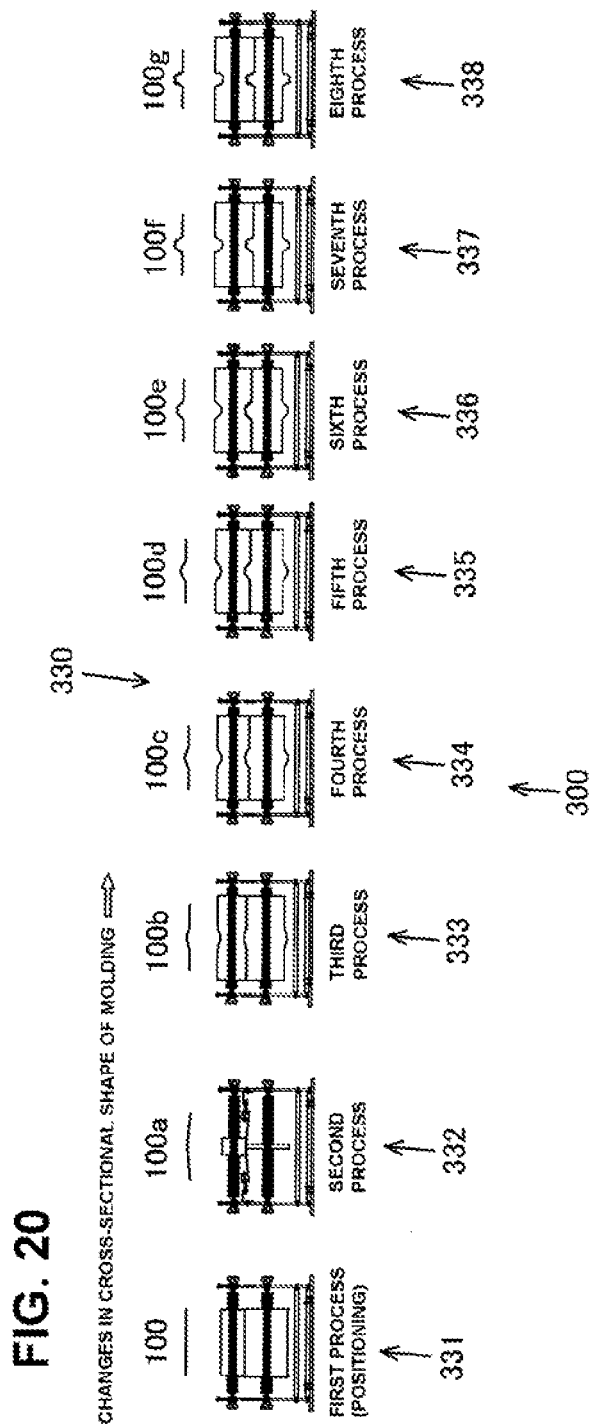
FIG. 20 is an explanatory diagram of a section preforming process.

FIG. 20 shows details of the preform shaping rollers 330 of the section preform device 300.

The preform shaping rollers 330 according to the present embodiment are divided into eight shaping roller groups 331-338 and configured to do preforming to produce a hat-shaped cross-section. The number of sets of shaping rollers 330 is not limited to eight, and a different number of sets may be used depending on the cross-sectional shape of the stringer.

When passing through the shaping roller groups 331 to 338, the prepreg laminate 100 undergoes preforming to acquire a hat-shaped cross section as shown by 100*a* to 100*g*.

Figure 21:
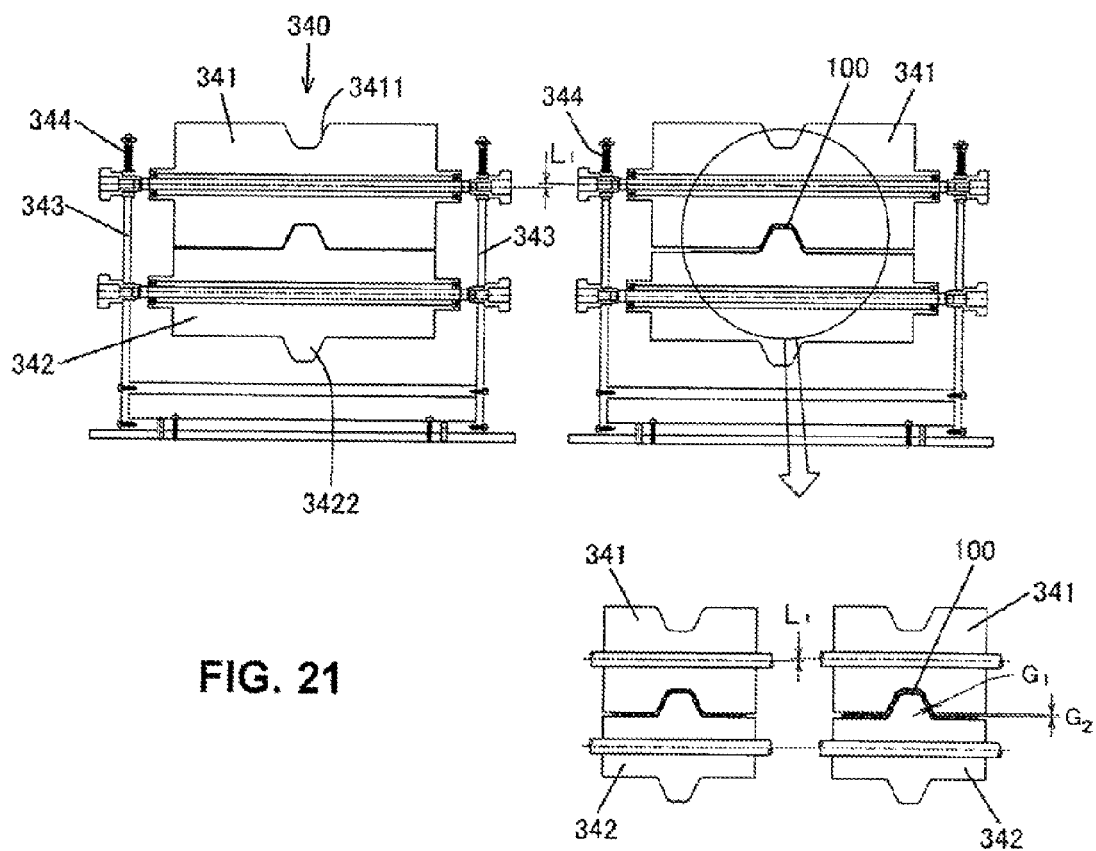
FIG. 21 is an explanatory diagram of a section preforming process.

FIG. 21 illustrates preforming done by one set of preform shaping rollers.

A detailed structure of the preform shaping roller 340 will be described.

The preform shaping roller 340 includes an upper roller 341 and lower roller 342 engaged vertically with each other, and opposite ends of both rollers 341 and 342 are rotatably supported by struts 343. The lower roller 342 has a convex forming die 3422 on a roller surface, and the upper roller 341 has a concave forming die 3411 in a roller surface to fit over the convex forming die 3422.

The upper roller 341 is constantly biased toward the lower roller 342 by a compression spring 344.

Thus, during passage of the prepreg laminate 100 and that area of the prepreg laminate 100 which differs in thickness dimension, the upper roller 341 rises by a dimension $L_1$ against the compression spring 344. During passage through a gap of the dimension $L_1$ between the upper roller 341 and lower roller 342, the prepreg laminate 100 is preformed into a hat-shaped cross section.

Figures 22, 23A, 23B:
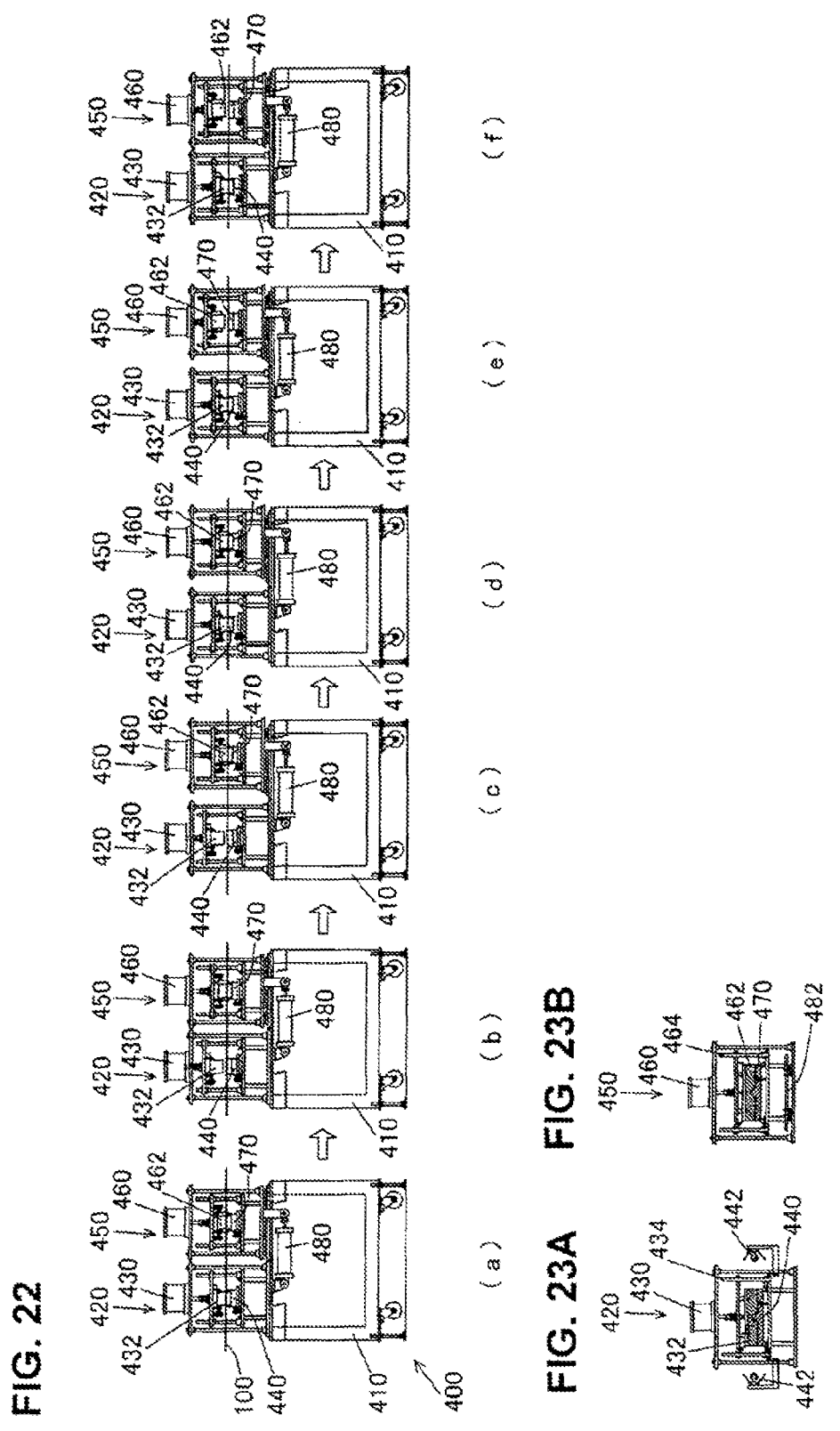

FIGS. 22, 23A, and 23B are explanatory diagrams showing operation of the press unit 420 and puller unit 450 of the press/puller device 400.

The press unit 420 and puller unit 450 are installed side by side. The press unit 420 includes an upper die 432 which moves up and down by means of a press cylinder 430 and a lower die 440 opposed to the upper die 432. The press cylinder may be a pneumatic cylinder or a motor-driven cylinder such as a servo motor.

The puller unit 450 includes an upper presser die 462 which moves up and down by means of a press cylinder 460 and a lower presser die 470 opposed to the upper presser die 462. The press cylinder may be a pneumatic cylinder or a motor-driven cylinder such as a servo motor.

The puller unit 450 has a function to reciprocate in upstream and downstream directions by means of a feed cylinder 480 and deliver the prepreg laminate 100 to a next process. The feed cylinder may be a pneumatic cylinder or a motor-driven cylinder such as a servo motor.

FIG. 23A is a front view of the press unit 420, where the upper die 432 moves up and down, being guided by a press die guide axis 434. Heaters 442 are placed on opposite sides of the upper die 432 and lower die 440 and the press unit 420 heats and presses prepreg laminate 100 by means of a pressing force from the press cylinder 460 and heat from the heaters 442. It is known that appropriate heating temperature is about 40° C. to 50° C., for example, in the case of epoxy resin although it depends on the properties of prepreg resin.

FIG. 23B is a front view of the puller unit 450. The upper presser die 462 moves up and down relative to the lower presser die 470, being guided by a presser die guide axis 464. The entire puller unit 450 moves, being guided by a feed guide axis 482 which is driven by a feed cylinder 480.

Parts (a) to (f) of FIG. 22 show processes of the press/puller device 400.

Part (a) of FIG. 22 shows a pressing process. The press cylinder 430 of the press unit 420 becomes activated, pushes the upper die 432 against the lower die 440, and thereby presses the prepreg laminate 100 located between the upper and lower dies in conjunction with the heaters 442.

Part (b) shows a pressing-pressure releasing process. The press cylinder 430 is deactivated and the upper die 432 is lifted. The prepreg laminate 100 is released from the grip of the upper die 432 and lower die 440 of the press unit 420. The press cylinder 460 of the puller unit 450 remains activated, holding the prepreg laminate 100.

Part (c) shows a feed process. The feed cylinder 480 is activated to move the press cylinder 460 away from the press unit 420.

As a result of this action, the prepreg laminate 100 is drawn out of the preform shaping rollers 330 of the section preform device 300.

Part (d) shows a feed finishing process. The press cylinder 430 is activated, the upper die 432 is lowered, and the prepreg laminate 100 is gripped between the upper die 432 and lower die 440.

Part (e) shows a presser releasing process. The press cylinder 460 of the puller unit 450 is deactivated and the upper presser die 462 is lifted.

Part (f) shows a feeder return process. With the prepreg laminate 100 gripped by the upper die 432 and lower die 440 of the press unit 420, the feed cylinder 480 is deactivated and the entire puller unit 450 is pulled back toward the press unit 420, thereby completing one cycle.

If the time required for processes shown in Parts (a) to (f) of FIG. 22, i.e., for one cycle, is, for example, 5 seconds and an amount of travel of the feed cylinder per move is 15 mm, a travel distance per unit time of the prepreg laminate, i.e., molding speed, will be 10.8 meters per hour. It has been demonstrated experimentally that this level of molding speed, i.e., molding at 7.5 to 15 meters/hour is achievable.

FIGS. 24A to 24C show configuration of an upper die 468 (elastic material) and upper die 438 (elastic material) used when there is an area with a different thickness in the middle of the prepreg laminate 100.

FIGS. 24A and 24B show the same molding material differing in thickness.

A prepreg laminate 100*y* has an angular projection y in a central portion. When pressure is applied with the elastic upper die 438 being interposed between the upper die 432 of the press unit 420 and the prepreg laminate 100*y* and with the upper die 468 being placed between the upper presser die 462 of the puller unit 450 and the prepreg laminate 100*y*, the upper dies 438 and 468 made of elastic material absorb forces in the directions of arrows x by elasticity.

FIG. 24C shows a case in which molding material varies in height such as flange thickness. When pressure is applied with similar upper dies 438 and 468 being placed on molding material 100*t*, height difference t is absorbed by elasticity of the elastic material.

In this way, by placing an elastic material under the upper die, it is possible to deal with a material with varying thickness.

Figure 25:
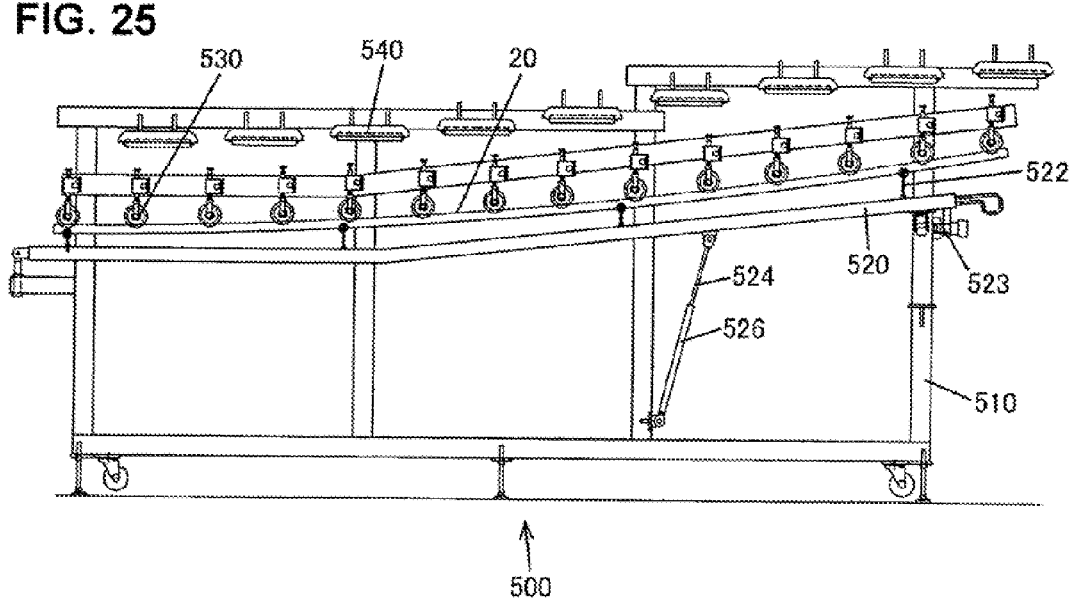
FIG. 25 is an explanatory diagram of a curing mold forming device.
Figure 26:
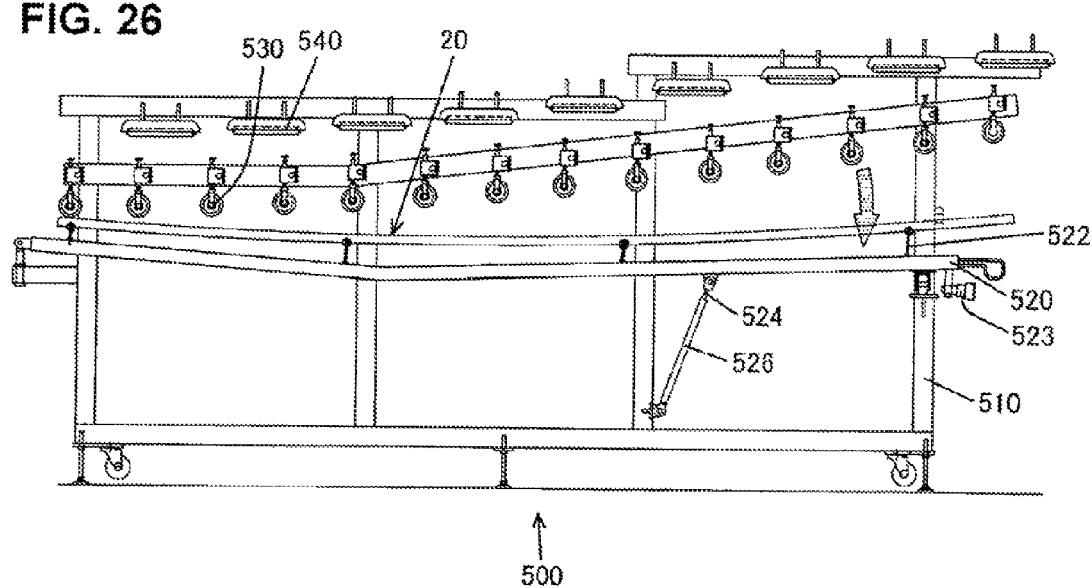
FIG. 26 is an explanatory diagram of a curing mold forming device.
Figure 27:
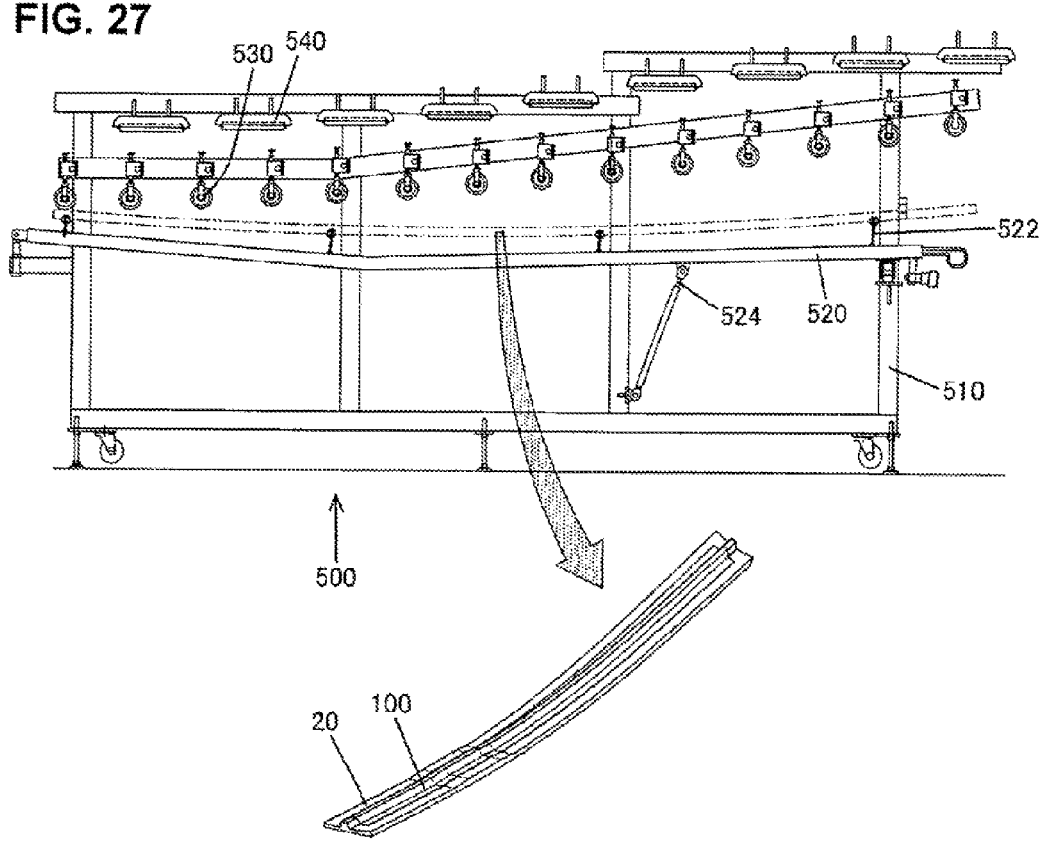
FIG. 27 is an explanatory diagram of a curing mold forming device.

FIGS. 25 to 27 show details of the curing mold forming device 500. The curing mold forming device 500 includes the table 520 supported by the base 510, and the curing mold 20 is mounted on the table 520 via a support 522. The table 520 is configured to be movable up and down by means of a piston 524 driven by a cylinder 526. The table 520 is pushed up to a raised position by the piston 524 and positioned by a stopper 523.

The table 520 is equipped with the plural molding guide rollers 530 and the prepreg laminate 100 delivered from a preceding process (puller unit) is formed along a surface of the curing mold 20 whose mounting surface corresponds to a preformed shape.

Above the base 510, the heaters 540 are disposed along the table 520 to soften the prepreg laminate 100 on the table 520 to such rigidity as to be suitable for forming, where the prepreg laminate 100 is formed so as to conform to the shape of the curing mold 20. It is known that appropriate heating temperature is about 40° C. to 50° C., for example, in the case of epoxy resin although it depends on the properties of prepreg resin.

FIG. 26 shows a state resulting from completion of forming after the entire prepreg laminate 100 is fed into the forming die member 20 and the molding guide roller 530 forms the prepreg laminate 100 into a desired formed shape.

The stopper 523 is removed, the piston 524 is compressed by operating the cylinder 526, and thereby the table 520 is pulled down together with the curing mold 20 away from the molding guide rollers 530.

FIG. 27 shows how the curing mold 20 with the formed prepreg laminate 100 placed thereon have been removed from the support 522 on the table 520.

The curing mold 20 with the prepreg laminate 100 placed thereon is sent to a next process, being carried by the work carrier 700 described in FIG. 13 and later.

Figure 28C:
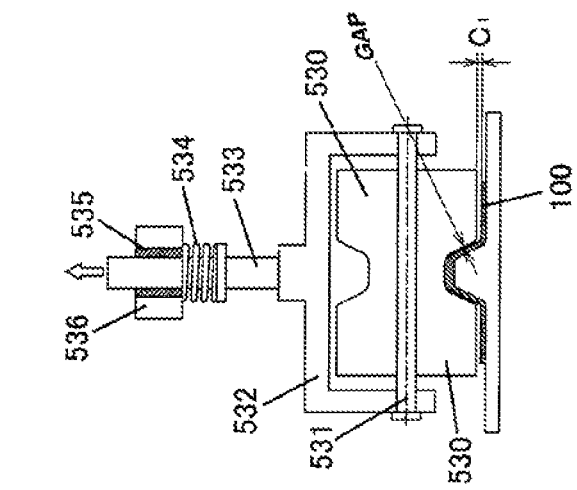
FIG. 28C is an explanatory diagram of a curing mold forming roller.
Figure 28B:
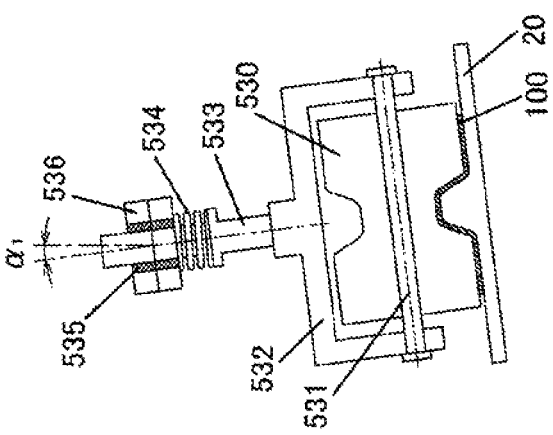
FIG. 28B is an explanatory diagram of a curing mold forming roller.
Figure 28A:
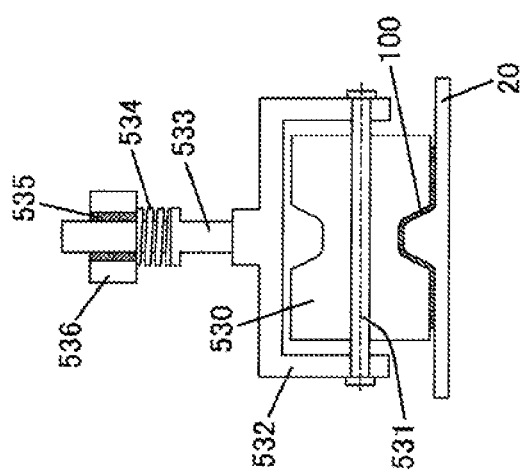
FIG. 28A is an explanatory diagram of a curing mold forming roller.

FIGS. 28A to 28C show a detailed structure of the molding guide roller 530. The molding guide roller 530 is supported turnably around a through-shaft 531 supported by a frame 532. The frame 532 is mounted on a fixed side 536 by a shaft 533 via a linear motion bearing 535.

The compression spring 534 is placed between the shaft 533 and fixed side 536, constantly pressing the shaft 533 toward the foaming die member 20. Thus, the molding guide roller 530 supported by the frame 532 presses the prepreg laminate 100 against the curing mold 20 to form the prepreg laminate 100.

As shown in FIG. 28B, at a location where the curing mold 20 is twisted, the shaft 533 inclines by an angle $\alpha_1$ in a twisting direction and the molding guide roller 530 is also inclined by a twisting angle of $\alpha_1$, conforming to an attitude of the forming die member 20.

Also, if the prepreg laminate 100 has an area difference in thickness dimension, the compression spring 534 compresses, raising the molding guide roller 530 by a dimension $C_1$ equivalent to the thickness height to deal with the difference.

FIG. 29 shows an example of a curing mold forming device equipped with a molding guide roller device 600.

The curing mold forming device here also includes the table 520 supported by the base 510, and the curing mold 20 is mounted on the table 520 via the support 522. The table 520 is configured to be movable up and down by means of the piston 524 driven by the cylinder 526. The table 520 is pushed up to a raised position by the piston 524 and positioned by a stopper 523.

Above the base 510, the heaters 540 are disposed along the table 520 as with the above example.

The process of removing the curing mold 20 after completion of forming is similar to the process shown in FIG. 26.

The molding guide roller device 600 is supported by struts 610 erected on the base 510.

Figure 30:
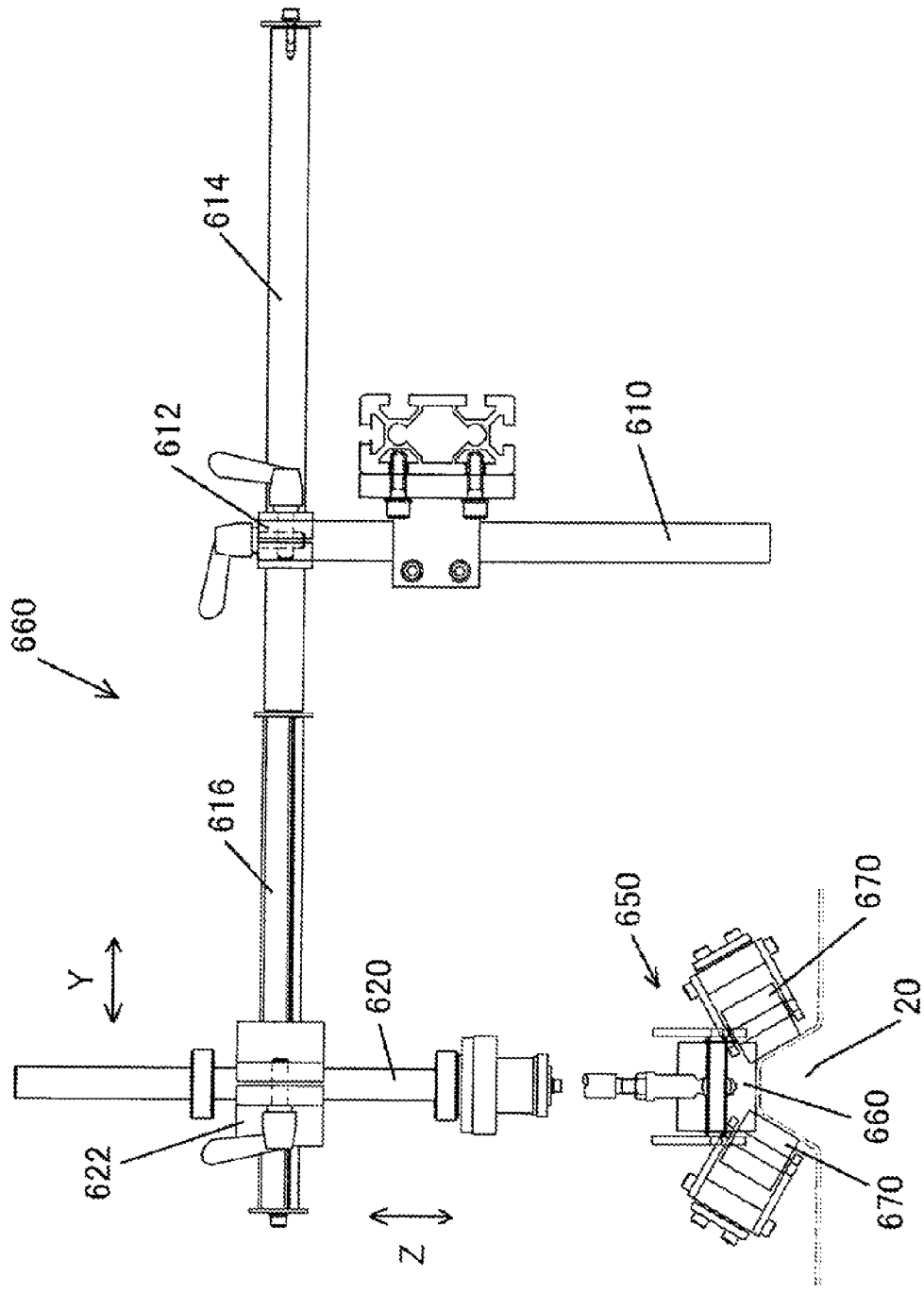
FIG. 30 is a front view of a molding guide roller device.
Figure 31:
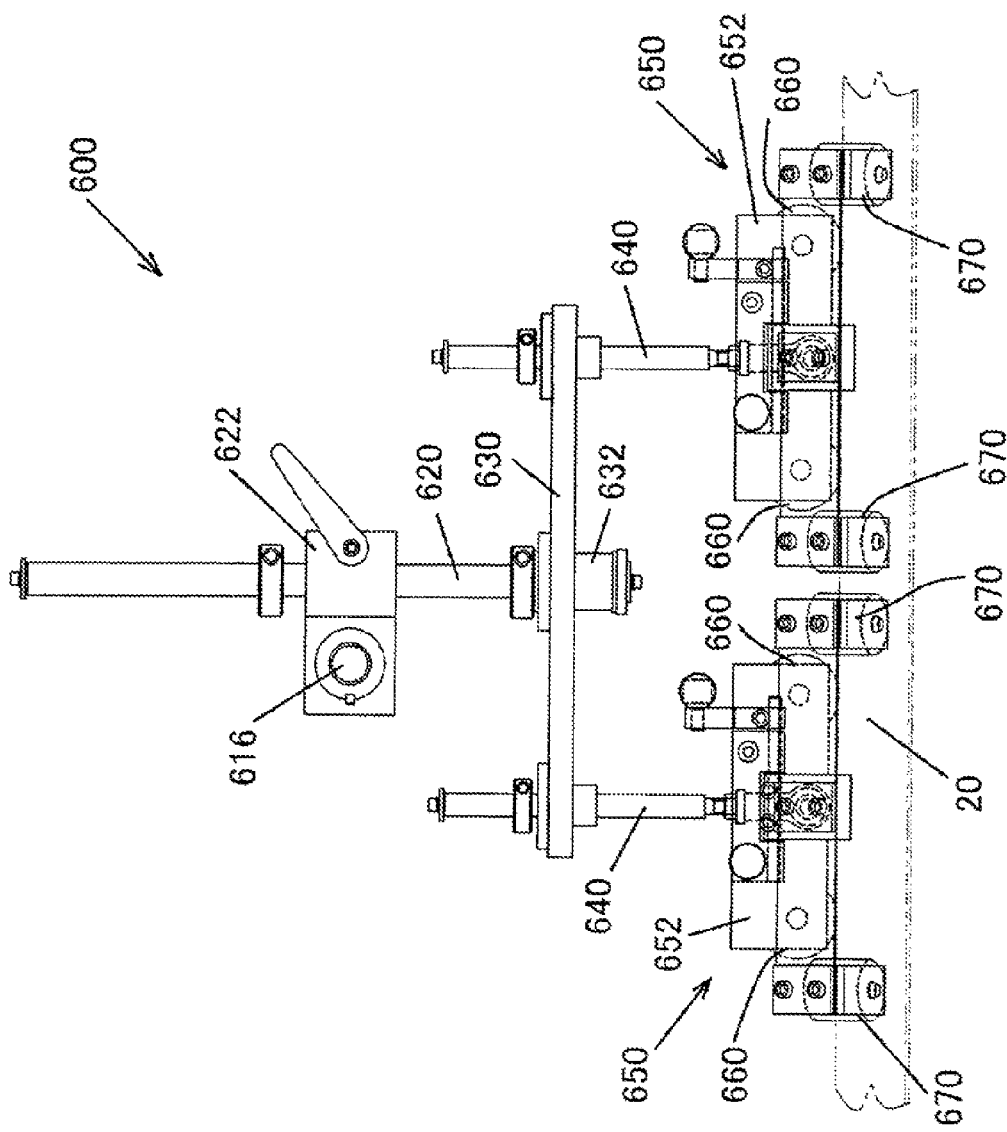
FIG. 31 is a side view of a molding guide roller device.

FIGS. 30 and 31 are a front view and side view of the molding guide roller device, respectively.

In upper part of the strut 610, a cross-bar 614 is supported by a fastening tool 612. Forward part of the cross-bar 614 is formed into a round bar 616.

A vertical support 620 is attached to the round bar 616 via a support clamp 622. The support clamp 622 is configured to be movable in a Y-axis direction together with the first vertical support 620.

The molding guide roller unit 650 is configured to be movable in a Z-axis direction when the support clamp 622 is operated.

In the molding guide roller device 600, a pair of molding guide roller units 650 are attached to opposite ends of a horizontal support 630 by second vertical supports 640, the horizontal support 630 being supported on the first vertical support 620 by a slewing bearing 632.

Each molding guide roller unit 650 includes two presser rollers 660 and four guide rollers 670 supported by a frame 652.

Figure 32:
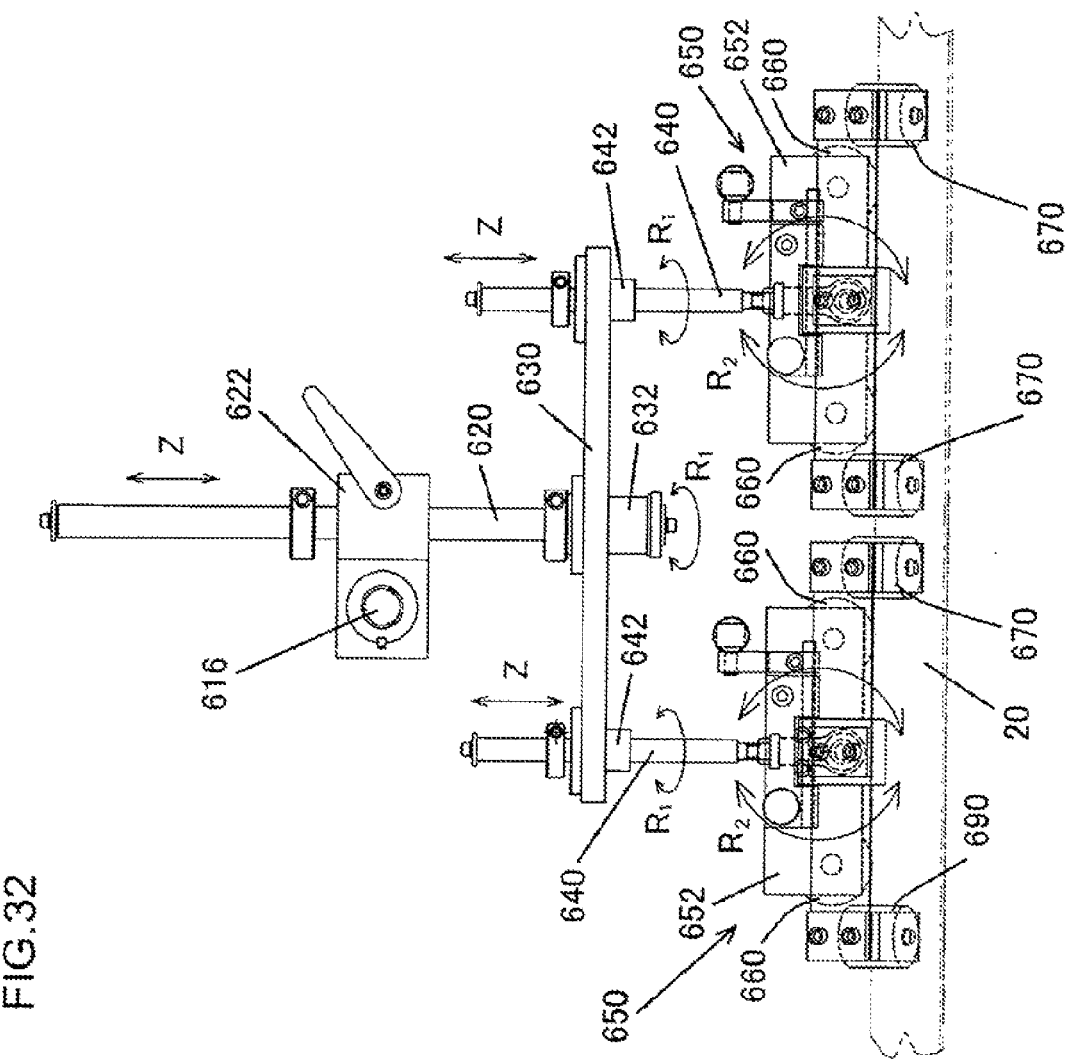
FIG. 32 is a side view of a molding guide roller device.

FIG. 32 shows motion directions of the molding guide roller units 650.

The first vertical support 620 and two second vertical supports 640 can move in the Z-axis direction, which corresponds to a vertical direction.

The horizontal support 630 supported by the first vertical support 620 rotates in the directions of arrows $R_1$, which correspond to a yaw direction. The frames 652 of the molding guide roller units 650 supported by the second vertical supports 640 rotate in the directions of arrows $R_2$, which correspond to a pitch direction.

Figure 33:
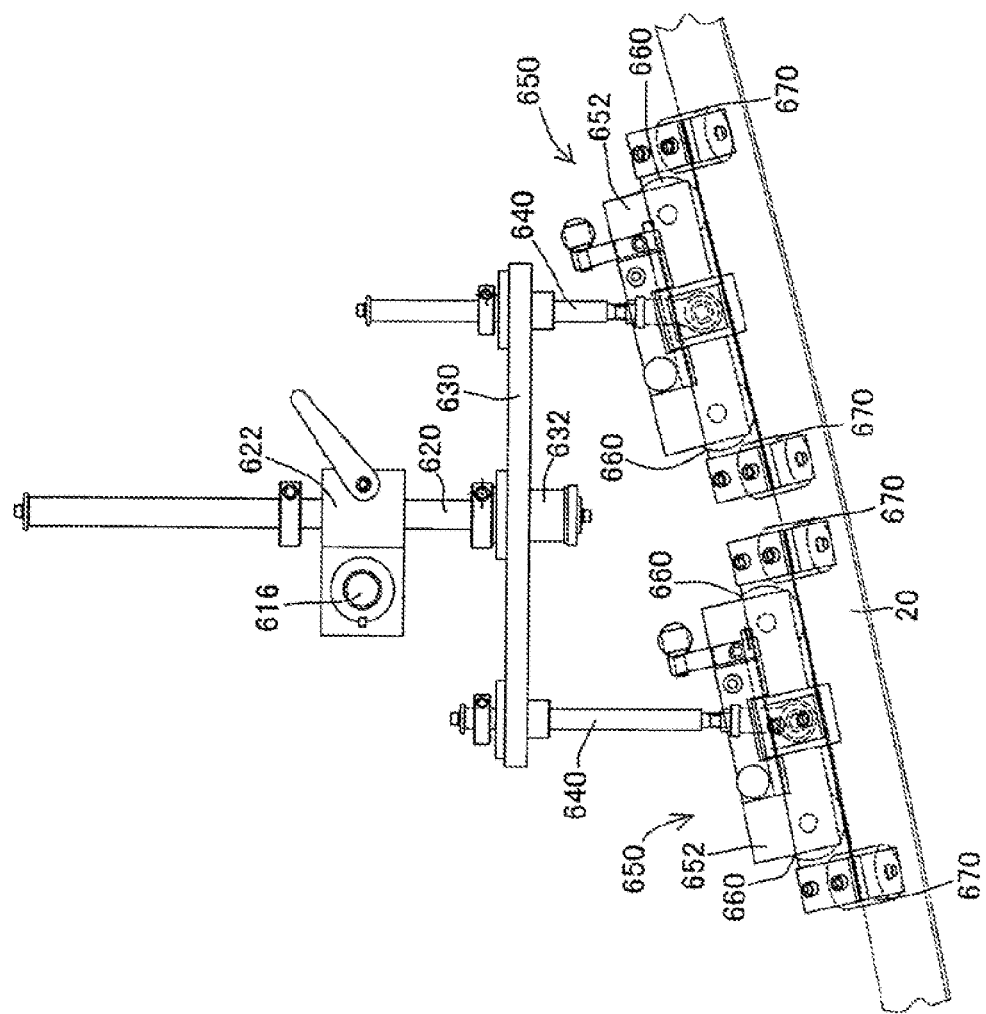
FIG. 33 is a side view of a molding guide roller device.

FIG. 33 shows how the two molding guide roller units 650 apply molding pressure at different height positions in the vertical direction.

The presser rollers 660 apply pressure to the curing mold 20 under their own weight acting on the presser roller 660. The pressure is applied at multiple points uniformly by four presser rollers 660, which are arranged uniformly along the curing mold 20.

Figure 34:
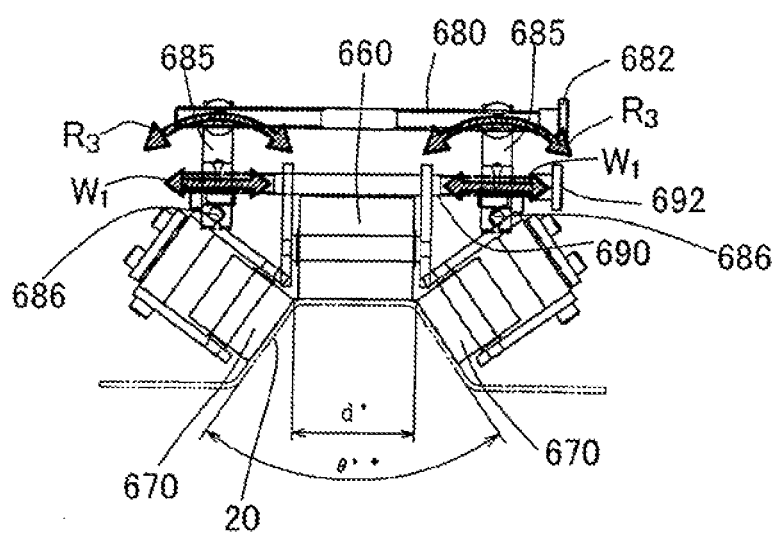
FIG. 34 is a front view of molding guide rollers.

FIG. 34 is a front view of the presser roller 660 as well as the guide rollers 670 placed on right and left sides of the presser roller 660.

A support member 685 of each guide roller 670 is in threaded engagement with two threaded shafts 680 and 690. The first threaded shaft 680 has leads opposite each other, and the guide roller 670 turns in the directions of arrow $R_3$ with an axis 686 acting as a center of rotation when a knob 682 is turned.

The second threaded shaft 690 also has leads opposite each other, and a width dimension $W_1$ of the guide roller 670 can be changed by turning a knob 692.

Figure 35:
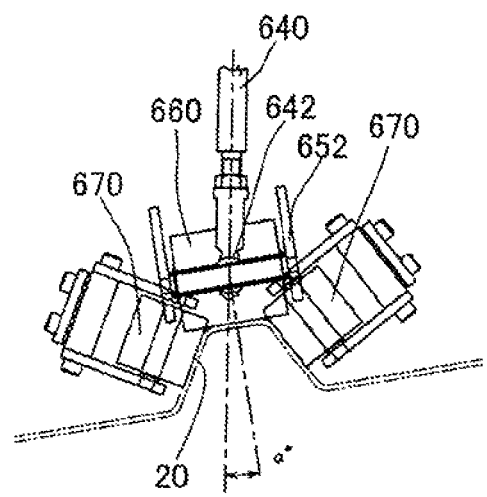
FIG. 35 is a front view of molding guide rollers.

FIG. 35 shows how the frame 652 has inclined with respect to the second vertical supports 640 by rolling on a spherical bearing 642.

The presser roller 660 and guide roller 670 can deal with inclined part of the curing mold 20.

Figure 36:
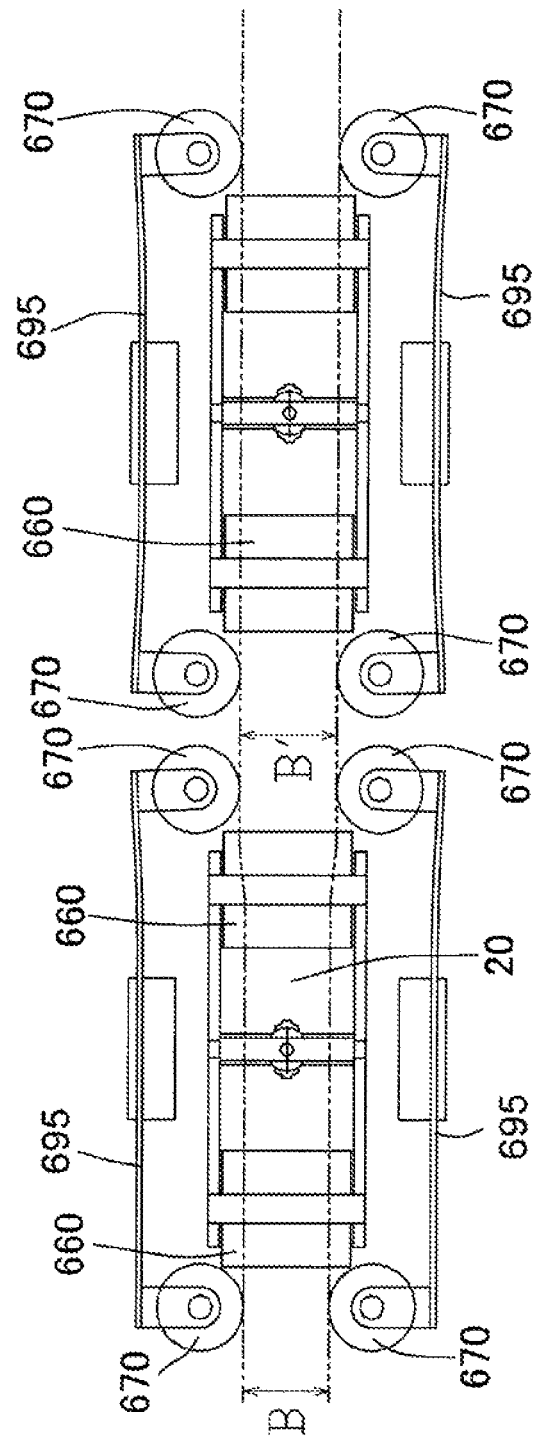
FIG. 36 is a plan view of molding guide rollers.

FIG. 36 shows a structure in which the guide rollers 670 are supported by leaf springs 695.

In the shown condition, even if a width dimension B of the curing mold 20 changes to B', the change can be followed due to the action of the spring.

Figure 37:
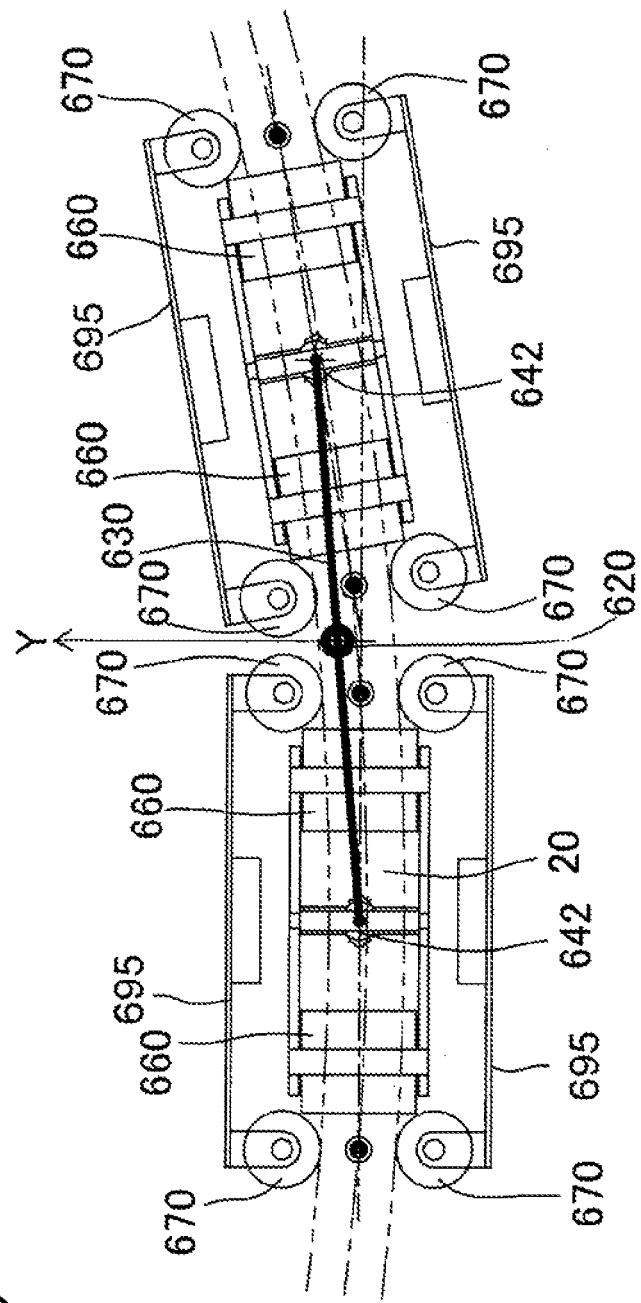
FIG. 37 is a plan view of molding guide rollers.

FIG. 37 shows how the curing mold 20 is curved in a plane. Due to the facts that the shaft 620 can move in the Y-direction and that the horizontal support turns around the shaft 620 as well as due to the action of the spherical bearing 642, the presser roller 660 and guide rollers 670 follow the curving of the curing mold 20 by performing yaw motion.

Thus, the present invention allows a composite stringer attached securely to an aircraft fuselage having three-dimensional curved surfaces to be continuously preformed in an efficient manner.

What is claimed is:

1. A continuous preform device for a composite stringer, the device being adapted to continuously preform a stringer made of laminated composite prepreg of a predetermined length and comprising:
   a dispenser device adapted to supply a prepreg laminate to a next process by sandwiching upper and lower faces of the prepreg laminate with carrier films;

a section preform device adapted to form the prepreg laminate into a desired cross-sectional shape together with the carrier films;

a press/puller device adapted to apply a pressing process to the prepreg laminate sandwiched between the carrier films while intermittently feeding the composite subjected to the pressing process downstream; and a curing mold forming device equipped with a forming die member and a guide roller adapted to form the incoming prepreg laminate sandwiched between the carrier films into a shape appropriate to a process preceding a curing process, wherein the curing mold forming device comprises: a heater; a table adapted to go up and down by supporting the curing mold; a plurality of molding guide rollers adapted to press the prepreg laminate via a compression spring, the prepreg laminate being sandwiched between the carrier films and put on the curing mold.

2. The continuous preform device for a composite stringer according to claim 1, wherein the dispenser device comprises a table adapted to put the prepreg laminate thereon; a reel installed at one end of the table and adapted to supply the carrier film for the lower face; a reel installed at another end of the table and adapted to supply the carrier film for the upper face; and a guide plate.

3. The continuous preform device for a composite stringer according to claim 1, wherein the section preform device comprises a plurality of preform shaping rollers and a heater adapted to form a cross-sectional shape of the prepreg laminate sandwiched between the carrier films into a hat shape or an omega shape.

4. The continuous preform device for a composite stringer according to claim 1, wherein the press/puller device comprises a press unit provided with an upper die, a lower die, and a heater; an upper presser die and a lower presser die; and a feed cylinder and a heater adapted to cause the entire press unit to reciprocate.

5. A continuous preform device for a composite stringer, the device being adapted to continuously preform a stringer made of laminated composite prepreg of a predetermined length and comprising:

a dispenser device adapted to supply a prepreg laminate to a next process by sandwiching upper and lower faces of the prepreg laminate with carrier films;

a section preform device adapted to form the prepreg laminate into a desired cross-sectional shape together with the carrier films;

a press/puller device adapted to apply a pressing process to the prepreg laminate sandwiched between the carrier films while intermittently feeding the composite subjected to the pressing process downstream and a curing mold forming device equipped with a forming die member and a guide roller adapted to form the incoming prepreg laminate sandwiched between the carrier films into a shape appropriate to a process preceding a curing process, wherein the curing mold forming device comprises a molding guide roller unit, the molding guide roller unit including two presser rollers adapted to press an upper face of a forming die member hat-shaped in cross section, and four guide rollers adapted to press a side face of the forming die member.

6. The continuous preform device for a composite stringer according to claim 5, wherein the molding guide roller unit is movable in a Y-axis direction and a Z-axis direction and turnable in a roll direction, a pitch direction, and a yaw direction, where the Y-axis direction corresponds to a horizontal direction orthogonal to a longitudinal direction of the forming die member while the Z-axis direction corresponds to a vertical direction.

7. The continuous preform device for a composite stringer according to claim 5, wherein widths and angles of the guide rollers in the molding guide roller unit are adjustable.

* * * * *